United States Patent
Yamada

(10) Patent No.: US 11,720,311 B2
(45) Date of Patent: Aug. 8, 2023

(54) NON-TRANSITORY COMPUTER READABLE INFORMATION RECORDING MEDIUM, OPERATION TERMINAL AND OUTPUT SYSTEM TO DETERMINE A FUNCTION AN OUTPUT DEVICE PROVIDES BASED ON OBTAINING THE FUNCTION INFORMATION BY A FIRST METHOD, WHEREIN THE FUNCTION INFORMATION MAY INCLUDE A FUNCTION INDICATING A PRINTING FUNCTION OR A PROJECTION FUNCTION

(71) Applicant: Kazuhiro Yamada, Kanagawa (JP)

(72) Inventor: Kazuhiro Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/242,703

(22) Filed: Apr. 28, 2021

(65) Prior Publication Data

US 2021/0247944 A1    Aug. 12, 2021

Related U.S. Application Data

(63) Continuation of application No. 16/263,116, filed on Jan. 31, 2019, now Pat. No. 11,023,192, which is a
(Continued)

(30) Foreign Application Priority Data

Jul. 10, 2012  (JP) ................................ 2012-154916
Jul. 4, 2013   (JP) ................................ 2013-140311

(51) Int. Cl.
*G06F 3/12*    (2006.01)
*H04N 1/00*   (2006.01)

(52) U.S. Cl.
CPC .......... *G06F 3/1293* (2013.01); *G06F 3/1206* (2013.01); *G06F 3/1247* (2013.01);
(Continued)

(58) Field of Classification Search
CPC ...... G06F 3/1204; G06F 3/1256; G06F 3/126; G06F 3/1292; G06F 3/1226;
(Continued)

(56) References Cited

U.S. PATENT DOCUMENTS 7,221,901 B2    5/2007   Watanabe
7,536,128 B2    5/2009   Haga
(Continued)

FOREIGN PATENT DOCUMENTS

JP    2001-306120    11/2001
JP    2003-114773    4/2003
(Continued)

OTHER PUBLICATIONS

Extended European Search Report for 13175721.3 dated Nov. 5, 2013.
(Continued)

*Primary Examiner* — Chad Dickerson
(74) *Attorney, Agent, or Firm* — IPUSA, PLLC

(57) ABSTRACT

A non-transitory computer readable information recording medium stores a program therein. The program when executed by one or more processors causes an operation terminal to perform determining, based on information that the operation terminal obtains from the outside in response to an operation performed on the operation terminal, an electronic apparatus from among a plurality of electronic apparatuses connected to the operation terminal, the electronic apparatus being one which is to output electronic data stored in an information storage apparatus connected to the operation terminal; obtaining, from the information storage
(Continued)

apparatus, electronic data from among a plurality of sets of electronic data stored in the information storage apparatus in a format that the determined electronic apparatus is capable of outputting; and transmitting the obtained electronic data to the determined electronic apparatus.

17 Claims, 26 Drawing Sheets

Related U.S. Application Data continuation of application No. 15/891,702, filed on Feb. 8, 2018, now Pat. No. 10,235,115, which is a continuation of application No. 15/402,296, filed on Jan. 10, 2017, now Pat. No. 9,928,017, which is a continuation of application No. 13/936,390, filed on Jul. 8, 2013, now Pat. No. 9,575,704.

(52) U.S. Cl.
CPC .......... *G06F 3/1265* (2013.01); *G06F 3/1292* (2013.01); *H04N 1/0001* (2013.01); *H04N 1/00307* (2013.01); *H04N 1/00334* (2013.01); *H04N 1/00408* (2013.01); *G06F 3/1232* (2013.01); *H04N 2201/0082* (2013.01); *H04N 2201/0094* (2013.01)

(58) Field of Classification Search
CPC .... G06F 3/1228; G06F 3/1232; G06F 3/1244; G06F 3/1285; G06F 3/1288; G06F 3/1289; G06F 3/14; G06F 3/1206; G06F 3/1247; G06F 3/1265; G06F 3/1293; H04N 1/0001; H04N 1/00307; H04N 1/00334; H04N 1/00408; H04N 2201/0082; H04N 2201/0094
USPC ......... 358/1.1, 1.9, 2.1, 1.11–1.18, 400–404; 709/201–203, 213–219; 348/207.99, 348/207.2, 207.1; 455/41.1, 41.2, 41.3
See application file for complete search history.

(56) References Cited

U.S. PATENT DOCUMENTS

| | | | | |
|---|---|---|---|---|
| 8,610,935 | B1* | 12/2013 | McKinley | H04N 1/00363 |
| | | | | 358/1.15 |
| 2003/0050963 | A1 | 3/2003 | Lamming et al. | |
| 2004/0024743 | A1 | 2/2004 | Kato | |
| 2004/0128349 | A1 | 7/2004 | Maruyama | |
| 2005/0102356 | A1* | 5/2005 | Manion | G06T 1/00 |
| | | | | 709/204 |
| 2005/0231739 | A1 | 10/2005 | Lee et al. | |
| 2005/0235077 | A1* | 10/2005 | Kubota | H04L 67/51 |
| | | | | 710/62 |
| 2005/0279833 | A1 | 12/2005 | Tanaka | |
| 2006/0095514 | A1 | 5/2006 | Wang et al. | |
| 2006/0239236 | A1 | 10/2006 | Otsuka | |
| 2007/0152058 | A1 | 7/2007 | Yeakley et al. | |
| 2008/0180699 | A1 | 7/2008 | Selvaraj | |
| 2008/0239375 | A1 | 10/2008 | Okajima | |
| 2009/0033972 | A1* | 2/2009 | Kato | G06F 3/1236 |
| | | | | 358/1.15 |
| 2009/0103124 | A1 | 4/2009 | Kimura et al. | |
| 2010/0069008 | A1 | 3/2010 | Oshima et al. | |
| 2010/0171930 | A1 | 7/2010 | Kurosawa | |
| 2010/0171973 | A1 | 7/2010 | Kimura | |
| 2010/0231958 | A1 | 9/2010 | Okigami | |
| 2011/0066471 | A1 | 3/2011 | Kitada et al. | |
| 2011/0066685 | A1* | 3/2011 | Kitada | H04L 51/08 |
| | | | | 709/206 |
| 2011/0085196 | A1 | 4/2011 | Liu et al. | |
| 2011/0096354 | A1* | 4/2011 | Liu | G06F 3/1292 |
| | | | | 358/1.15 |
| 2011/0194140 | A1* | 8/2011 | Sweet | G06F 3/1204 |
| | | | | 358/1.15 |
| 2011/0242594 | A1 | 10/2011 | Yabe | |
| 2012/0008161 | A1 | 1/2012 | Rouhana | |
| 2012/0086980 | A1 | 4/2012 | Numata | |
| 2012/0239830 | A1 | 9/2012 | Sugimura et al. | |
| 2012/0287460 | A1 | 11/2012 | McMillin et al. | |
| 2012/0311189 | A1 | 12/2012 | Yamada | |
| 2013/0009967 | A1 | 1/2013 | Nanaumi | |
| 2013/0038899 | A1 | 2/2013 | Seikh et al. | |
| 2013/0088748 | A1 | 4/2013 | Mikami et al. | |

FOREIGN PATENT DOCUMENTS

| | | |
|---|---|---|
| JP | 2003-319365 | 11/2003 |
| JP | 2007-087169 | 4/2007 |
| JP | 2011-035833 | 2/2011 |
| KR | 2012-0064213 | 6/2012 |

OTHER PUBLICATIONS

Japanese Office Action for 2013-140311 dated Feb. 14, 2017.
Extended European Search Report for 19158005.9 dated Jul. 12, 2019.
Office Action dated Sep. 22, 2021 issued with respect to the corresponding European Patent Application No. 19158005.9.

* cited by examiner

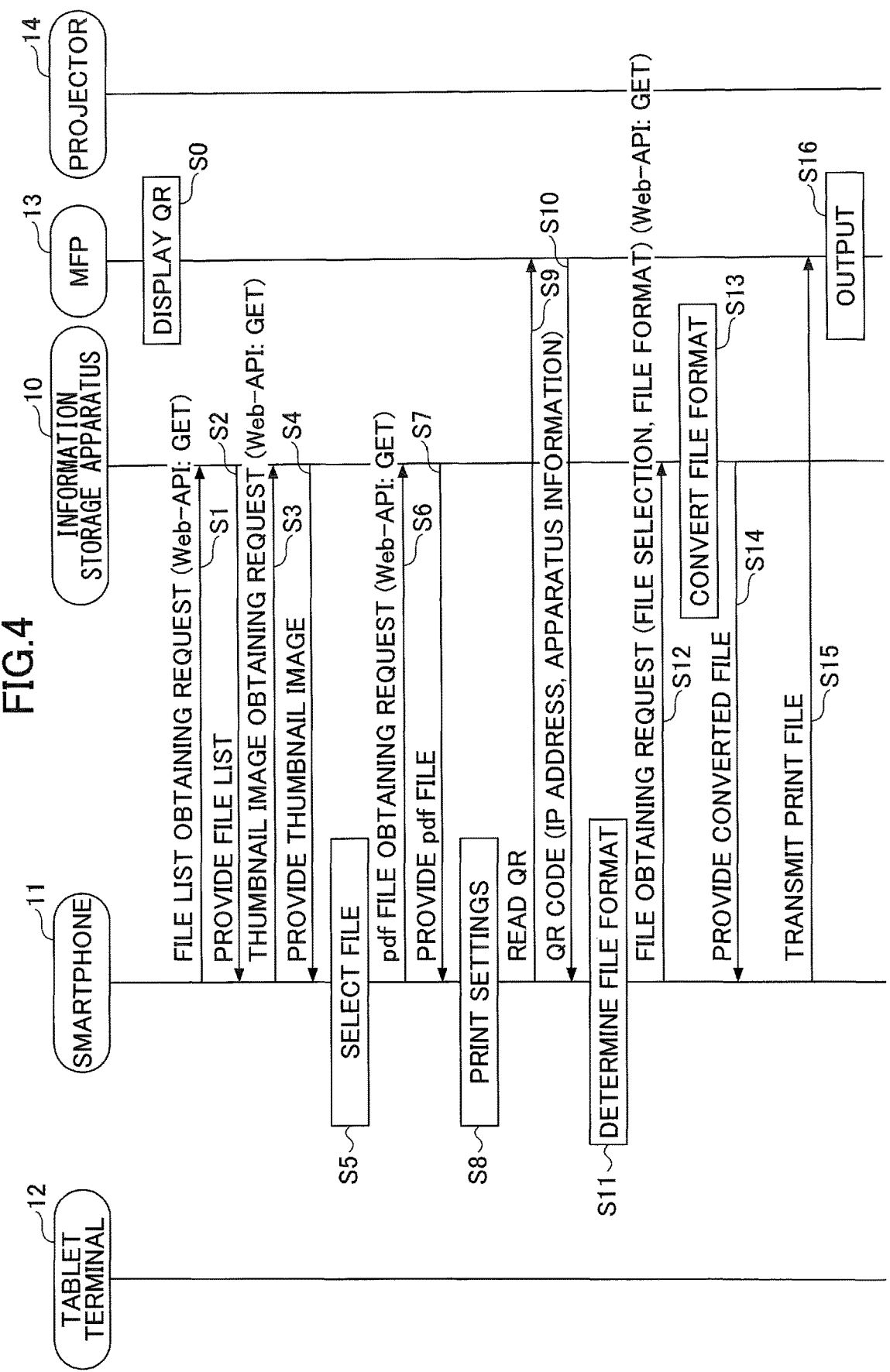

FIG.5

| # | PROTOCOL | METHOD | DESCRIPTION | EXAMPLE |
|---|---|---|---|---|
| 1 | HTTP | GET | OBTAIN FILE LIST | http://<IP ADDRESS>/folder?folderPath=AllUsers/data/test&startIndex=1&count=10 |
| 2 | HTTP | GET | OBTAIN THUMBNAIL IMAGE | http://<IP ADDRESS>/folder/thumbnail?filePath=AllUsers/data/test.doc |
| 3 | HTTP | GET | OBTAIN pdf FILE | http://<IP ADDRESS>/folder/image?filePath=AllUsers/data/test.doc |
| 4 | HTTP | GET | OBTAIN rpcs FILE | http://<IP ADDRESS>/folder/rpcs?filePath=AllUsers/data/test.doc<br>&printCopies=1<br>&printDocumentSize=A4<br>&printPaperSize=A4<br>&printDocumentOrientation=Portrait<br>&printColorBw=Color<br>&printSort=Sort<br>&printDuplex=None<br>&printLayout=None |
| 5 | HTTP | GET | OBTAIN IMAGE FILE | http://<IP ADDRESS>/folder/image?filePath=AllUsers/data/test.doc&pageNumber=1 |

FIG.6

```
{"filelist":[{"name":"20091106.ppt",
    "size":2137088,
    "last_access_time":1323148816453,
    "is_dir":false,
    "last_modified_time":1282784936697,
    "creation_time":1317084202953,
    "convertible_format":["thumbnail","jpeg","pdf","rpcs"],
    "converted_format":["thumbnail"],
    "total_pages":20}, {"name":"Blue hills.jpg",
    "size":28521,
    "last_access_time":1322740650125,
    "is_dir":false,
    "last_modified_time":1091707200000,
    "creation_time":1315479900890,
    "converted_format":,
    "total_pages":1}]

"total_results":20}
```

|   | ATTRIBUTE NAME |   | RANGE | DESCRIPTION |
|---|---|---|---|---|
| 1 | filelist | name | String | IT FOLDER NAME |
| 2 | | size | long | FILE SIZE (NUMBER OF BYTES) |
| 3 | | is_dir | boolean | FOLDER:true, FILE:false |
| 4 | | last_access_time | long | ACCESS DATE AND TIME |
| 5 | | last_modified_time | long | LATEST UPDATED DATE AND TIME |
| 6 | | creation_time | long | CREATION DATE AND TIME |
| 7 | | convertible_format | String[] | FILE FORMAT(S) TO WHICH FILE CAN BE CONVERTED |
| 8 | | converted_format | String[] | FILE FORMAT TO WHICH FILE HAS BEEN CONVERTED |
| 9 | | total_pages | int | TOTAL NUMBER OF PAGES |
| 10 | total_results | | int | TOTAL NUMBER OF FILES |

PRINT SETTINGS

COMPLETE

| NUMBER OF COPIES | 1 |
| COLOR | ON |
| SIZE OF SHEET(S) OF PAPER | AUTOMATIC SELECTION |
| SIMPLEX/DUPLEX | DUPLEX, LEFT-TO-RIGHT |

FIG.13

| ITEM | SETTING VALUE | DESCRIPTION |
|---|---|---|
| HostAddress | 192.168.0.10 | IP ADDRESS OF MFP |
| Function | Scan,Print | FUNCTION INFORMATION |

FIG.15

| # | PROTOCOL | METHOD | PARAMETER | DESCRIPTION |
|---|---|---|---|---|
| 1 | TCP/IP (SOCKET COMMUNICATION) | send | socket | DESIGNATE PORT NUMBER AND TRANSMISSION DESTINATION |
| | | | data | PRINT DATA |

FIG.16

| # | COMMAND | PARAMETER | DESCRIPTION |
|---|---|---|---|
| 1 | doPrint | fileName | FILE NAME OF FILE TO PRINT |
| 2 | PrintSetting | printCopies | NUMBER OF COPIES |
| | | printColorBw | COLOR/MONOCHROME |
| | | printPaperSize | PAPER SIZE |
| | | printDuplex | SIMPLEX/DUPLEX |

FIG.21

| ITEM | SETTING VALUE | DESCRIPTION |
|---|---|---|
| HostAddress | 192.168.0.10 | IP ADDRESS OF PROJECTOR |
| name | PRJ1234 | PROJECTOR NAME |
| Function | Projection | FUNCTION INFORMATION |
| ProjectionType | Protocol:XXXX | TYPE OF PROJECTOR |

FIG.22

| # | PROTOCOL | METHOD | DESCRIPTION | REQUEST URL |
|---|---|---|---|---|
| 1 | HTTP | POST | PROJECT BY PROJECTOR | http://IP ADDRESS/service/projection/ |

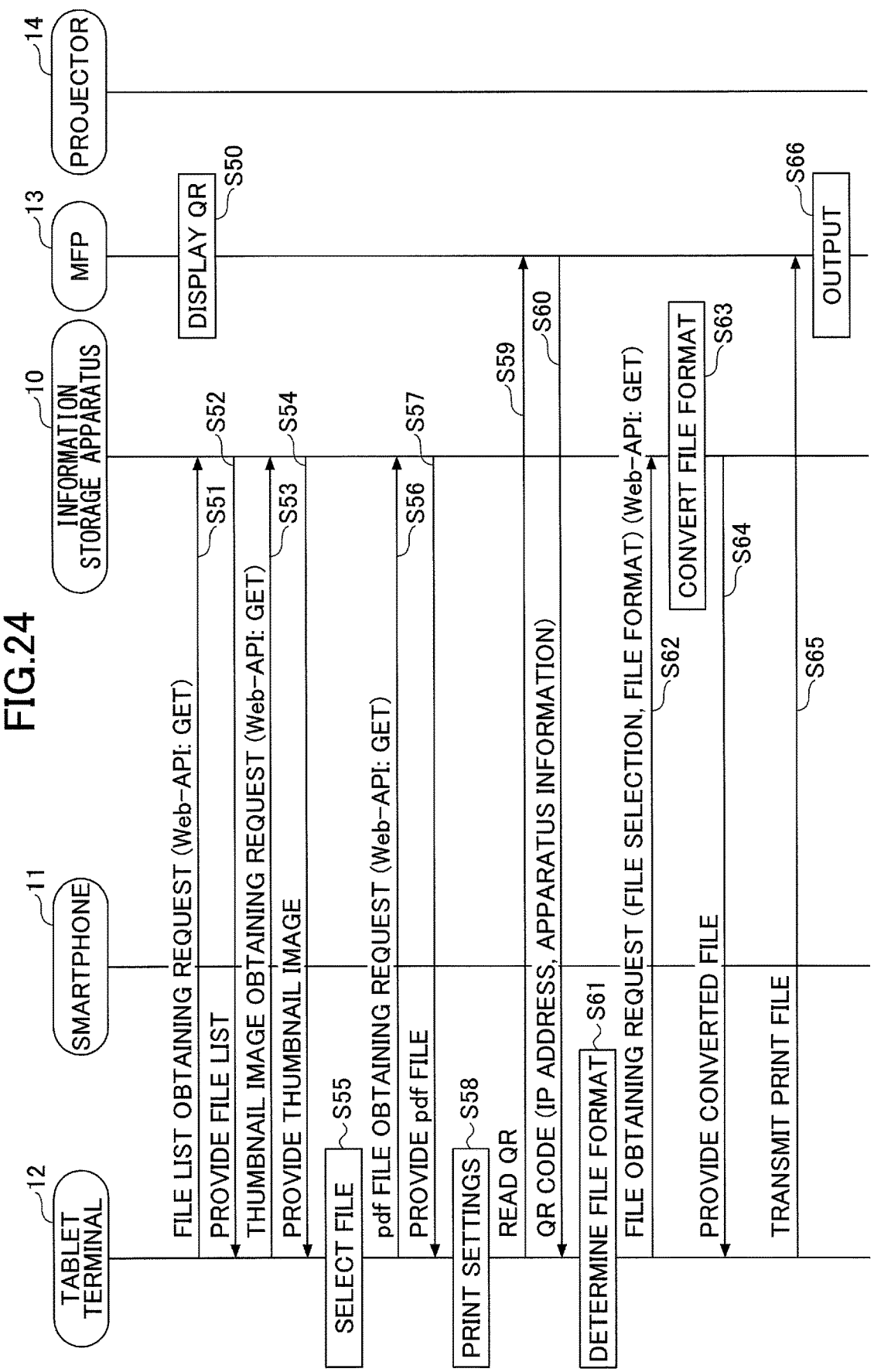

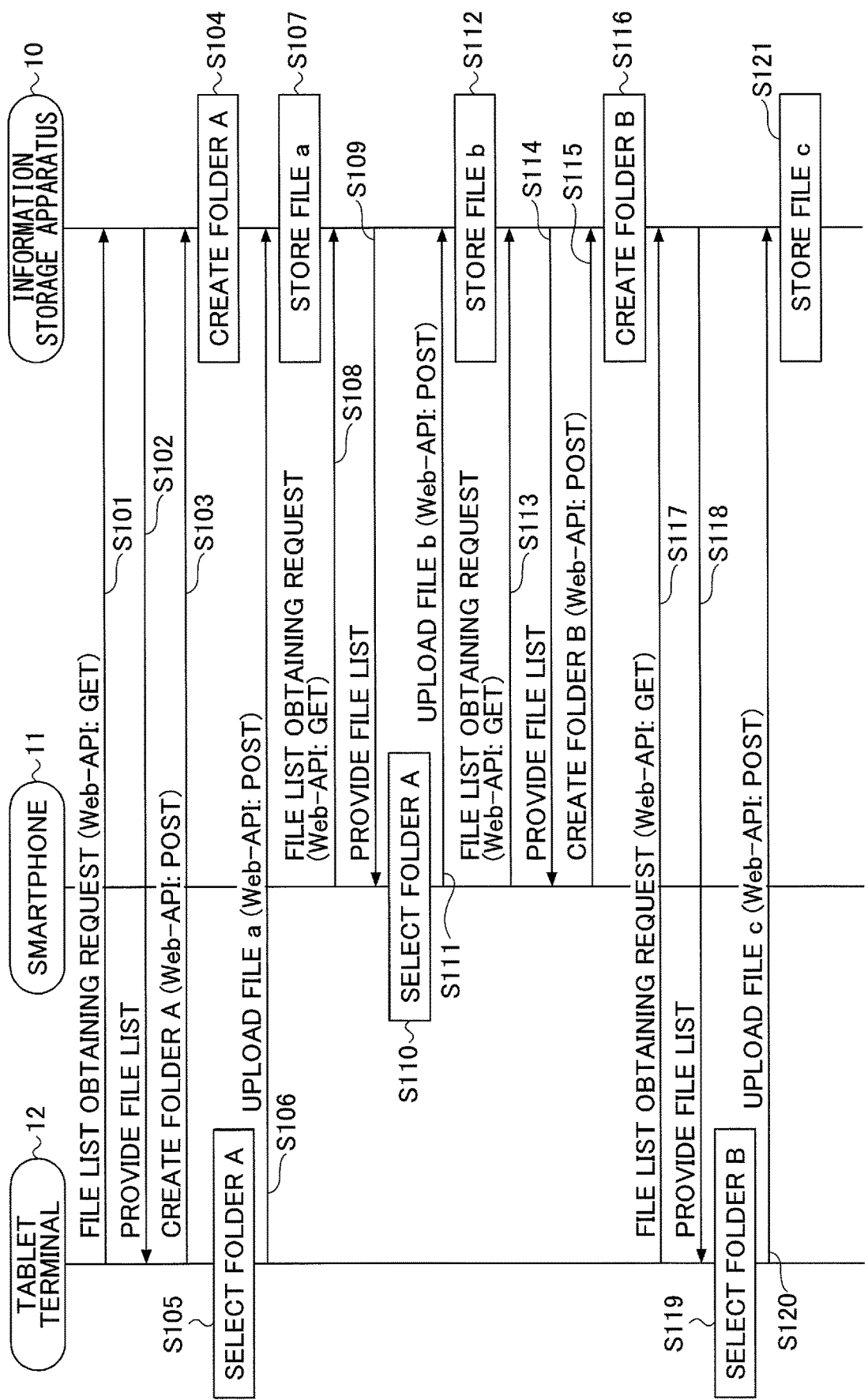

FIG.26

| # | PROTOCOL | METHOD | DESCRIPTION | REQUEST URL | REQUEST BODY |
|---|---|---|---|---|---|
| 1 | HTTP | POST | CREATE FILE | http://IP ADDRESS/folder/operation/create_folder | {"path":"/AllUsers/data/share"} |
| 2 | HTTP | POST | DELETE FILE OR FOLDER | http://IP ADDRESS/folder/operation/delete | {"path":"/AllUsers/data/share"} |
| 3 | HTTP | POST | COPY FILE OR FOLDER | http://IP ADDRESS/folder/operation/copy | {"from_path":"/AllUsers/data/share1", "to_path":"/AllUsers/data/share2", "overwrite":true} |
| 4 | HTTP | POST | UPLOAD FILE | http://IP ADDRESS/folder/files?filePath=AllUsers/data/test.doc&overwrite=true | |

FIG.27

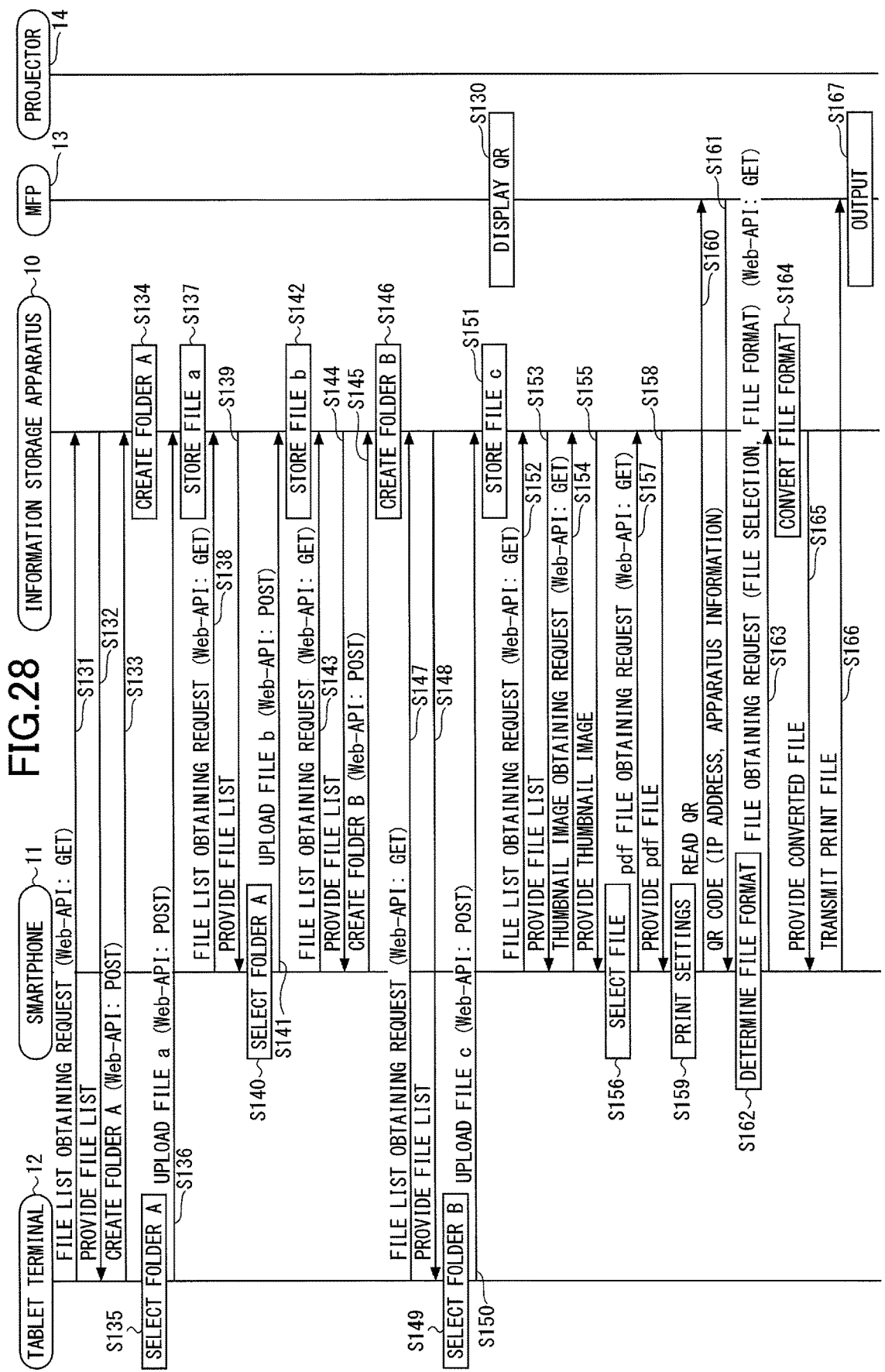

NON-TRANSITORY COMPUTER READABLE INFORMATION RECORDING MEDIUM, OPERATION TERMINAL AND OUTPUT SYSTEM TO DETERMINE A FUNCTION AN OUTPUT DEVICE PROVIDES BASED ON OBTAINING THE FUNCTION INFORMATION BY A FIRST METHOD, WHEREIN THE FUNCTION INFORMATION MAY INCLUDE A FUNCTION INDICATING A PRINTING FUNCTION OR A PROJECTION FUNCTION

CROSS-REFERENCE TO RELATED APPLICATIONS

This application is a continuation of application Ser. No. 16/263,116, filed Jan. 31, 2019, which is a continuation of application Ser. No. 15/891,702, filed Feb. 8, 2018, which is a continuation of application Ser. No. 15/402,296, filed Jan. 10, 2017, which is a continuation of application Ser. No. 13/936,390, filed Jul. 8, 2013, which is based on and claims priority to Japanese Priority Application No. 2012-154916 filed on Jul. 10, 2012 and Japanese Priority Application No. 2013-140311 filed on Jul. 4, 2013. The entire contents of each of the aforementioned applications are hereby incorporated herein by reference.

BACKGROUND OF THE INVENTION

1. Field of the Invention

The present invention relates to a non-transitory computer readable information recording medium, an operation terminal and an output system.

2. Description of the Related Art

For example, a host session management server is known, which can easily realize a communication service using a plurality of different apparatuses that operate in cooperation with each other (for example, see Japanese Laid-Open Patent Application No. 2011-35833).

Recently, users use various electronic apparatuses such as a printer, a MultiFunction Peripheral (MFP), a projector and so forth, which output electronic data, and/or various information processing apparatuses such as a portable phone, a smartphone, a tablet terminal and so forth. Concerning such a mode (system) using these electronic apparatuses and information processing apparatuses, it is expected to improve the utility values thereof as a result of causing the various electronic apparatuses and information processing apparatuses to operate in cooperation with each other.

For this purpose, in such a system of using electronic apparatuses and information processing apparatuses, a mechanism has been demanded by which various electronic apparatuses and information processing apparatuses operate in cooperation with each other to provide a service(s).

SUMMARY OF THE INVENTION

According to one embodiment of the present invention, a non-transitory computer readable information recording medium stores a program therein. The program when executed by one or more processors causes an operation terminal to perform determining, based on information that the operation terminal obtains from the outside in response to an operation performed on the operation terminal, an electronic apparatus from among a plurality of electronic apparatuses connected to the operation terminal, the electronic apparatus being one which is to output electronic data stored in an information storage apparatus connected to the operation terminal; obtaining, from the information storage apparatus, electronic data from among a plurality of sets of electronic data stored in the information storage apparatus in a format that the determined electronic apparatus is capable of outputting; and transmitting the obtained electronic data to the determined electronic apparatus.

Other objects, features and advantages of the present invention will become more apparent from the following detailed description when read in conjunction with the accompanying drawings.

BRIEF DESCRIPTION OF THE DRAWINGS

FIG. 4 is a sequence diagram of one example of a procedure of the service providing system according to the first embodiment;

FIG. 5 illustrates one example of a HTTP request that the information storage apparatus receives;

FIG. 6 is a configuration diagram of one example of a response to a file list obtaining request;

FIG. 11 is an image diagram of one example of a print setting screen page;

FIG. 13 is a configuration diagram of one example of information to be read from a QR code;

FIG. 15 illustrates one example of a method of transmitting a print file to a MFP;

FIG. 16 is a configuration diagram of one example of print commands included in the print file;

FIG. 21 is a configuration diagram of another example of information to be read from a QR code;

FIG. 22 illustrates one example of a method of transmitting a projection file to a projector;

FIG. 24 is a sequence diagram of yet another example showing a procedure of the service providing system according to the first embodiment;

FIG. 25 is a sequence diagram of one example showing a procedure of a service providing system according to a second embodiment;

FIG. 26 illustrates one example of a HTTP request that the information storage apparatus receives;

FIG. 27 is an image diagram of a folder selection screen page; and

FIG. 28 is a sequence diagram of yet another example showing a procedure of the service providing system according to the second embodiment.

DETAILED DESCRIPTION OF THE EMBODIMENTS

Below, the embodiments of the present invention will be described.

First Embodiment

<System Configuration>

Figure 1:
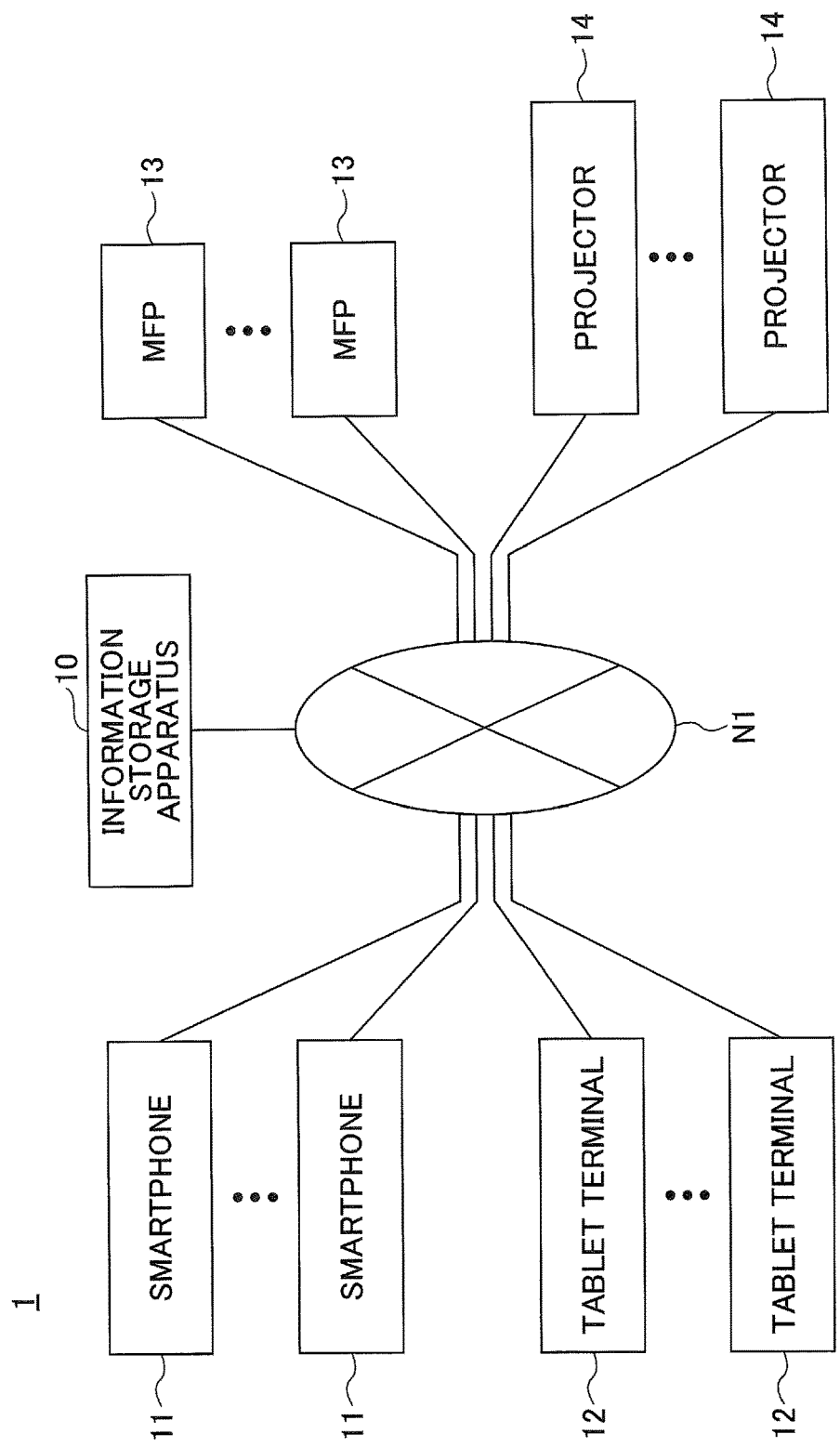
FIG. 1 is a configuration diagram of one example of a service providing system according to a first embodiment.

FIG. 1 is a configuration diagram of one example of the service providing system according to the first embodiment. In the service providing system 1 of FIG. 1, for example, an information storage apparatus 10, one or more smartphones 11, one or more tablet terminals 12, one or more MFPs 13 and one or more projectors 14 are connected to a network N1 such as a Local Area Network (LAN).

As the network N1, it is possible to use a network of a private environment such as an intranet, for example. The smartphones 11 and the tablet terminals 12 are examples of information processing apparatuses (operation terminals) that users carry and operate. Specific examples of the information processing apparatuses (operation terminals) may be apparatuses that users can operate, and thus include, not only the above-mentioned smartphones 11 and the tablet terminals 12, but also portable phones, notebook-size Personal Computers (PC), and so forth.

The MFPs 13 and the projectors 14 are examples of electronic apparatuses that provide services such as print, scan, projection and so forth. Specific examples of the electronic apparatuses may be apparatuses that can provide services, and thus include, not only the above-mentioned MFPs 13 and the projectors 14, but also printers, scanners, copiers, image display apparatuses, and so forth.

The MFPs 13 are examples of image forming apparatuses. The MFPs 13 have image taking functions, image forming functions and communication functions, and can be used as printers, facsimile machines, scanners and copiers. The projectors 14 are examples of image projection apparatuses, and have projection functions and communication functions.

The information storage apparatus 10 is one example of an information processing apparatus and is one example of a cooperative processing apparatus. The information storage apparatus 10 carries out such sophisticated processes that the MFPs 13 and projectors 14 cannot carry out, and carries out processes as a file server. The information storage apparatus 10 provides services using electronic apparatuses such as the MFPs 13 and/or the projectors 14 in cooperation with information processing apparatuses (operation terminals) such as the smartphones 11 and/or the tablet terminals 12. It is noted that the information storage apparatus 10 may be configured by a plurality of computers in a decentralized manner.

<Hardware Configuration>

Figure 2:
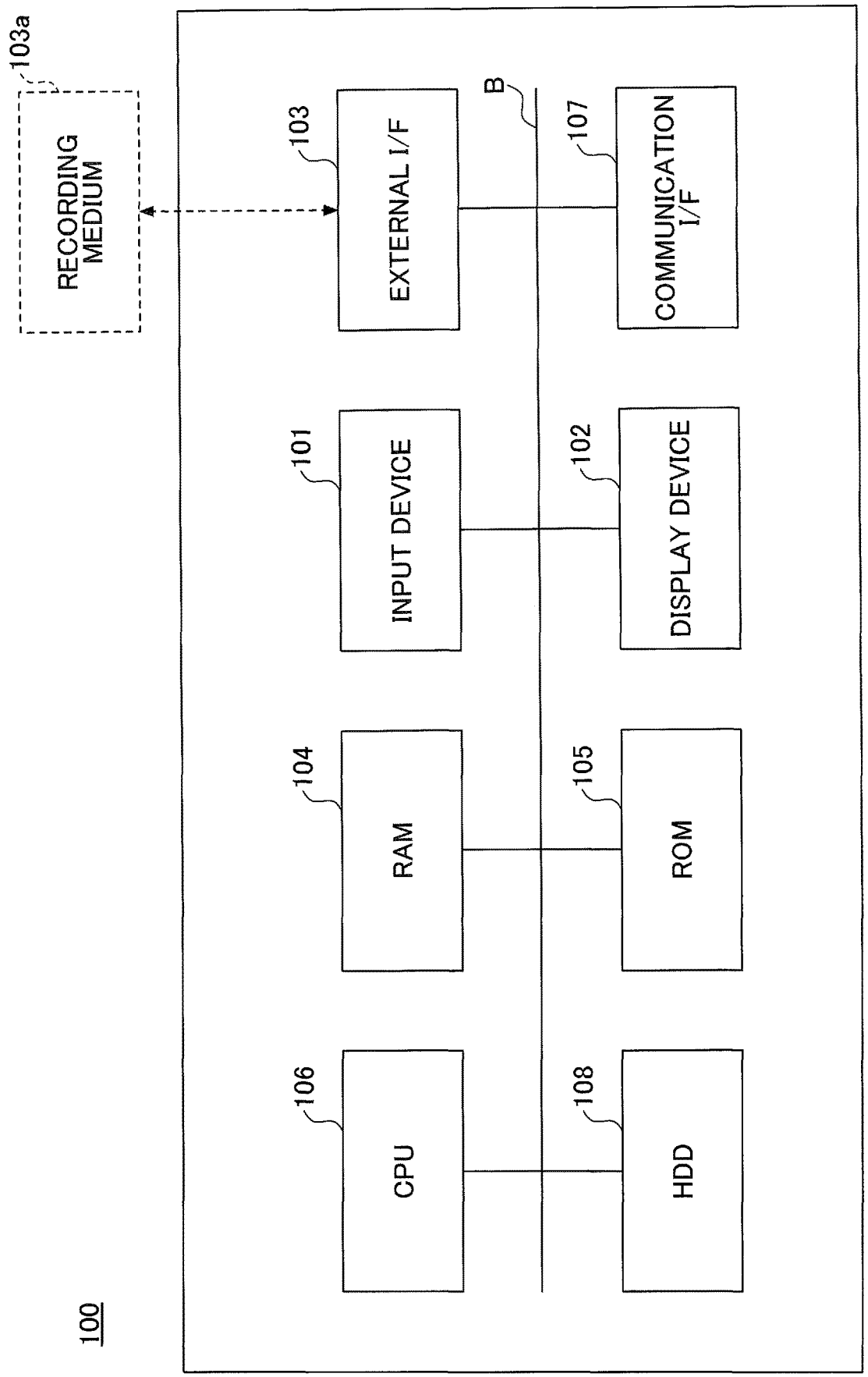
FIG. 2 is a hardware configuration diagram of one example of a computer system according to the first embodiment.

The information storage apparatus 10 is realized, for example, by a computer system having the hardware configuration shown in FIG. 2. Also, the other information processing apparatuses such as the smartphones 11 and the tablet terminals 12 include the hardware configurations shown in FIG. 2. FIG. 2 is a hardware configuration diagram of one example of the computer systems according to the first embodiment.

The computer system 100 of FIG. 2 includes an input device 101, a display device 102, an external I/F 103, a RAM 104, a ROM 105, a CPU 106, a communication I/F 107 and a Hard Disk Drive (HDD) 108, which are connected together via a bus B. The input device 101 includes a keyboard, a mouse and so forth, and is used to input respective operation signals.

The display device 102 includes a display and/or the like, and displays processing results of the computer system 100. The communication I/F 107 is an interface for connecting the computer system 100 to the network N1. Thereby, the computer system 100 can carry out data communication with the other apparatuses via the communication I/F 107.

The HDD 108 is a nonvolatile storage device storing programs and data. The programs stored by the HDD 108 include an Operating System (OS) that is basic software controlling the entirety of the computer system 100, application software providing various functions under the control of the OS, and so forth. The HDD 108 manages the stored programs and data using a predetermined file system and/or DataBase (DB).

The external I/F 103 is an interface between the computer system 100 and external devices. The external devices include a recording medium 103a and so forth. Thereby, the computer system 100 can carry out reading information from and/or writing information to the recording medium 103a via the external I/F 103. It is noted that specific examples of the recording medium 103a include a flexible disk, a CD, a Digital Versatile Disk (DVD), a SD memory card, a Universal Serial Bus memory (USB memory) and so forth.

The ROM 105 is a nonvolatile semiconductor memory (storage device) and thus can store programs and/or data even after the power supply has been turned off. The ROM 105 stores programs and data such as a Basic Input/Output System (BIOS) to be executed when the computer system 100 is started up, OS settings, network settings, and so forth. The RAM 104 is a volatile semiconductor memory (storage device) and temporarily stores programs and/or data.

The CPU 106 includes an arithmetic and logic unit(s), reads programs and/or data from storage device(s) such as the ROM 105 and/or HDD 108 to the RAM 140, carries out processes, and thus, realizes controls and/or functions of the entirety of the computer system 100.

The computer system 100 according to the first embodiment can realize various processes described later using this hardware configuration.

<Software Configuration>

Figure 3:
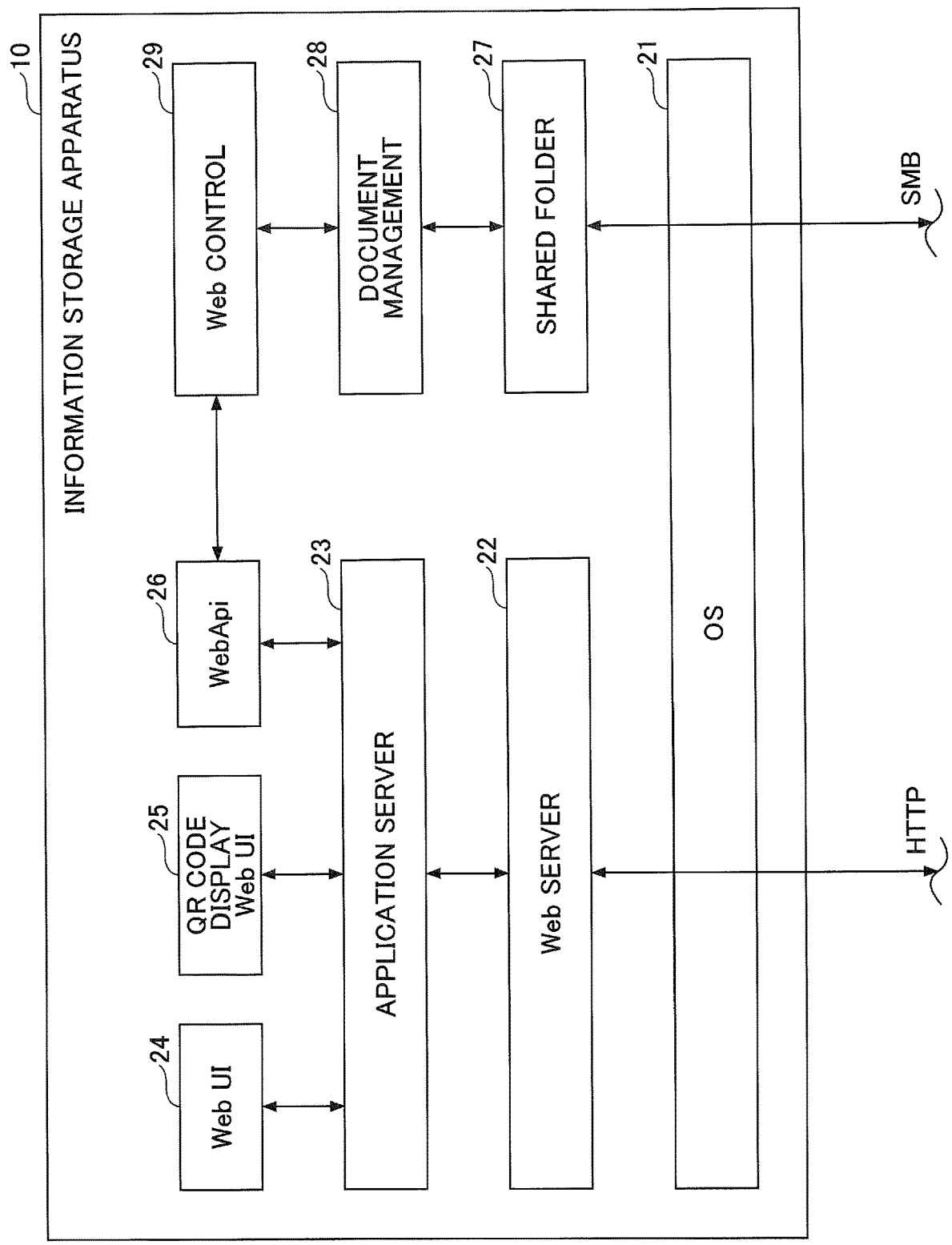
FIG. 3 is a processing block diagram of one example of an information storage apparatus according to the first embodiment.

The information storage apparatus 10 according to the first embodiment includes the processing blocks shown in FIG. 3, for example. The information storage apparatus 10 executes a program(s), and thus, realizes respective functions of an OS 21, a Web server 22, an application server 23, a Web UI 24, a QR code display Web UI 25, a WebApi 26, a shared folder 27, a document management part 28 and a Web control part 29.

The OS 21 is the OS of the information storage apparatus 10, and controls the entirety of the system of the information storage apparatus 10. The OS 21 is, for example, Windows (registered trademark), Linux (registered trademark) or the like.

The Web server 22 is software for transmitting and receiving information using Hyper Text Transfer Protocol (HTTP). The Web server 22 is, for example, Apache (registered trademark), IIS (registered trademark) or the like.

The application server 23 is software operating as plug-in of the Web server 22, for example. The application server 23 is, for example, Tomcat (registered trademark) or the like.

The Web UI 24 displays a system setting screen page in response to a HTTP request. A user can change settings via the system setting screen page using a Web browser (not shown).

The QR code display Web UI 125 displays, on the electronic apparatus such as the MFP 13, a screen page of QR code (registered trademark) as one example of code information, in response to a HTTP request. The QR code is a two-dimensional code of a matrix type.

The Web Application programming interface (WebApi) 26 can be used via the network N1. The WebApi receives an HTTP request, carries out a process(s) according to the HTTP request, and sends an HTTP response.

The WebApi 26 is an interface that is previously defined and provided for receiving a request from the information processing apparatus such as the smartphone 11, the tablet terminal 12 or the like, and includes a function(s), a class(es) and/or the like.

Further, it is possible to provide the WebApi 26 in a form of a Software Development Kit (SDK), to a developer who develops applications to be installed in the information processing apparatus(es). The developer can develop application(s) using the SDK. The SDK may also be provided to a third vender other than a person who provides the information storage apparatus 10. The third vendor can develop an application(s) using the provided SDK. The application(s) developed using the SDK can be installed in the information processing apparatus(s).

By thus providing the WebApi of the information storage apparatus 10 as a SDK, it is possible to install, in the information processing apparatus(es), not only an application(s) developed by a person who provides the information storage apparatus 10 but also an application(s) developed by a third vendor.

The shared folder 27 is a folder published to the network N1 by a Server Message Block (SMB) protocol. A user can access the shared folder 27 using the information processing apparatus such as the smartphone 11 or the tablet terminal 12. It is noted that the shared folder 27 is one example of a storage part The document management part 28 manages a file(s) placed in the shared folder 27 and carries out data conversion in response to a request given by the Web control part 29. It is noted that a "file(s)" in the first embodiment is(are) one form of data. The Web control part 29 carries out a process of controlling the document management part 28 according to a request given by the WebApi 26.

It is noted that, generally, two processes operate in the information storage apparatus 10. One of these two processes includes the Web server 22, the application server 23, the Web UI 24, the QR code display Web UI 25 and the WebApi 26. The other process includes the shared folder 27, the document management part 28 and the Web control part 29. Therefore, the WebApi 26 and the Web control part 29 carry out interprocess communication.

<Details of Processing>

Below, details of processing of the service providing system 1 according to the first embodiment will be described.

Here, processing will be described for a case where, using the smartphone 11, a file that the information storage apparatus 10 has is printed by the MFP 13. FIG. 4 is a sequence diagram of one example showing a procedure of the service providing system 1 according to the first embodiment. FIG. 5 illustrates one example of a HTTP request that the information storage apparatus 10 receives.

First, a user operates the smartphone 11, and selects a file list display process. When the file list display process has been thus selected by the user, the smartphone 11 sends a file list obtaining request to the information storage apparatus 10 by, for example, a HTTP request (GET) such as that shown in FIG. 5, in step S1.

Then, in step S2, the WebApi 26 of the information storage apparatus 10 receives the file list obtaining request, and sends a file list obtaining request to the Web control part 29. The Web control part 29 responds to the file list obtaining request sent by the WebApi 29, obtains a file list from the document management part 28 and returns the file list to the WebApi 26. The WebApi 26 then provides a list of files or folders to the smartphone 11 via a HTTP response such as that shown in FIG. 6.

FIG. 6 is a configuration diagram of one example of a response to a file list obtaining request such as that mentioned above. The response of FIG. 6 has a JSON format. However, the format of the response is not limited thereto, and any other format can be used as long as it is possible to display a list of files or folders by the smartphone 11. An application (software) installed in the smartphone 11 displays, based on such a response to a file list obtaining request shown in FIG. 6, a file list (including folder(s)) published by the information storage apparatus 10.

In a case where thumbnail images (miniaturized images) are needed to display the file list, the smartphone 11 sends a thumbnail image obtaining request via, for example, a HTTP request (GET) such as that shown in FIG. 5, to the information storage apparatus 10 in step S3. In step S4, the WebApi 26 of the information storage apparatus 10 receives the thumbnail image obtaining request, and sends a thumbnail image obtaining request to the Web control part 29. The Web control part 29 responds to the thumbnail image obtaining request from the WebApi 26, and sends a thumbnail image obtaining request to the document management part 28.

The document management part 28 obtains a file(s) from the shared folder 27, and generates thumbnail images. The Web control part 29 returns the thumbnail images that the document management part 28 has generated to the WebApi 26. The WebApi 26 provides the thumbnail images to the smartphone 11 via a HTTP response. The application installed in the smartphone 11 displays the thumbnail images based on the response to the thumbnail image obtaining request.

Figure 7:
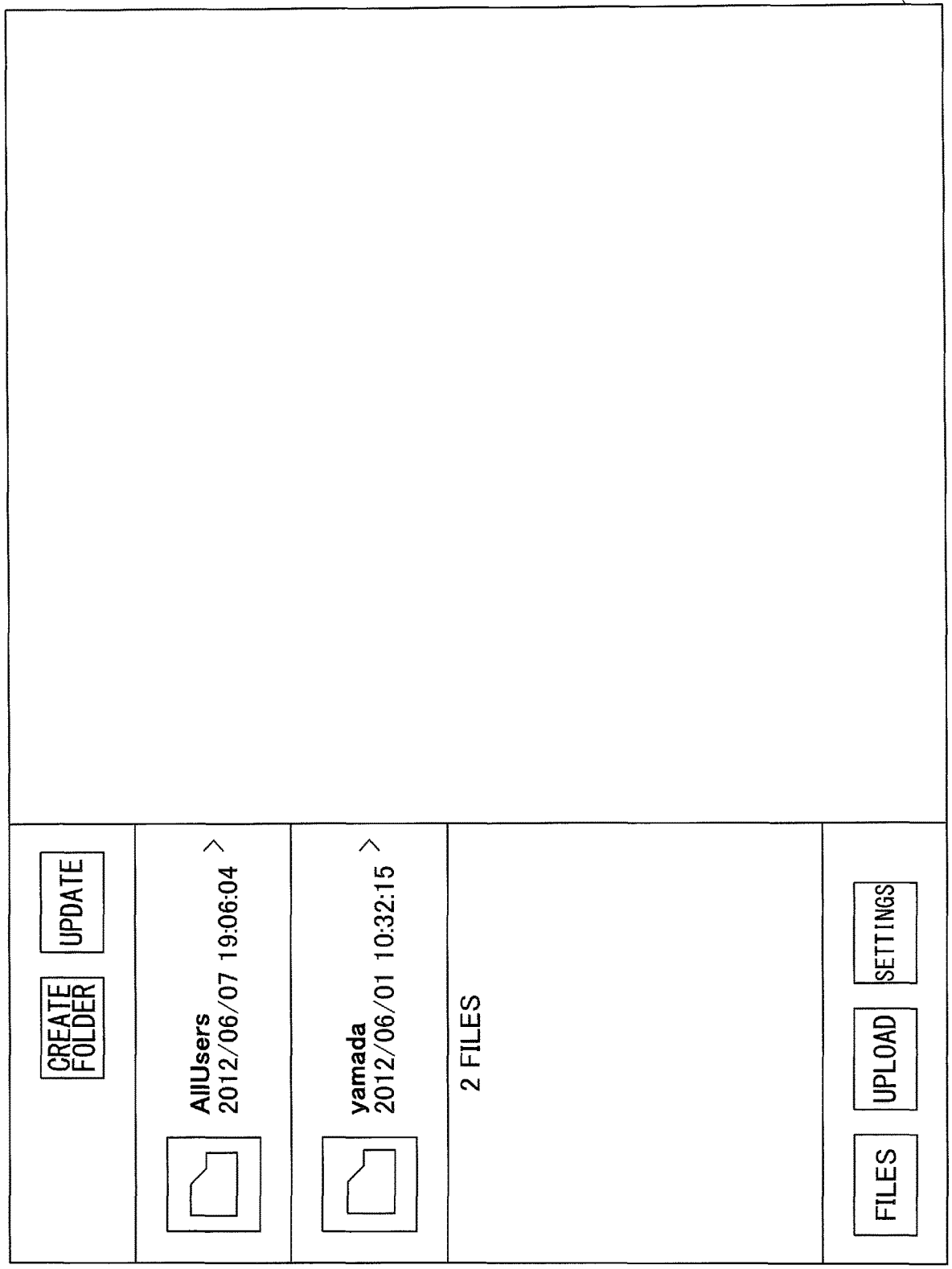
FIG. 7 is an image diagram of one example of an IT folder selection screen page.
Figure 8:
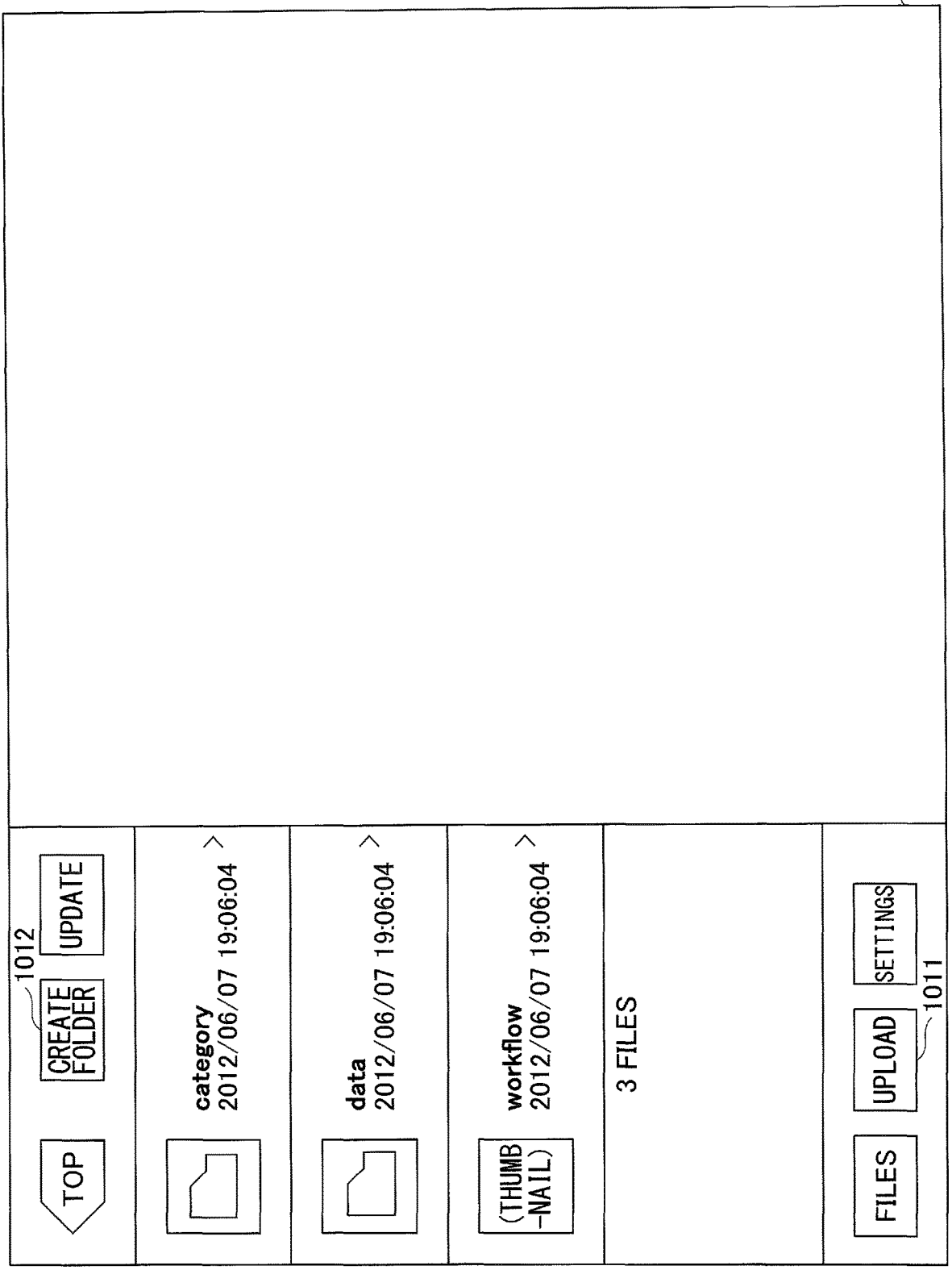
FIG. 8 is an image diagram of one example of a folder display screen page.
Figure 9:
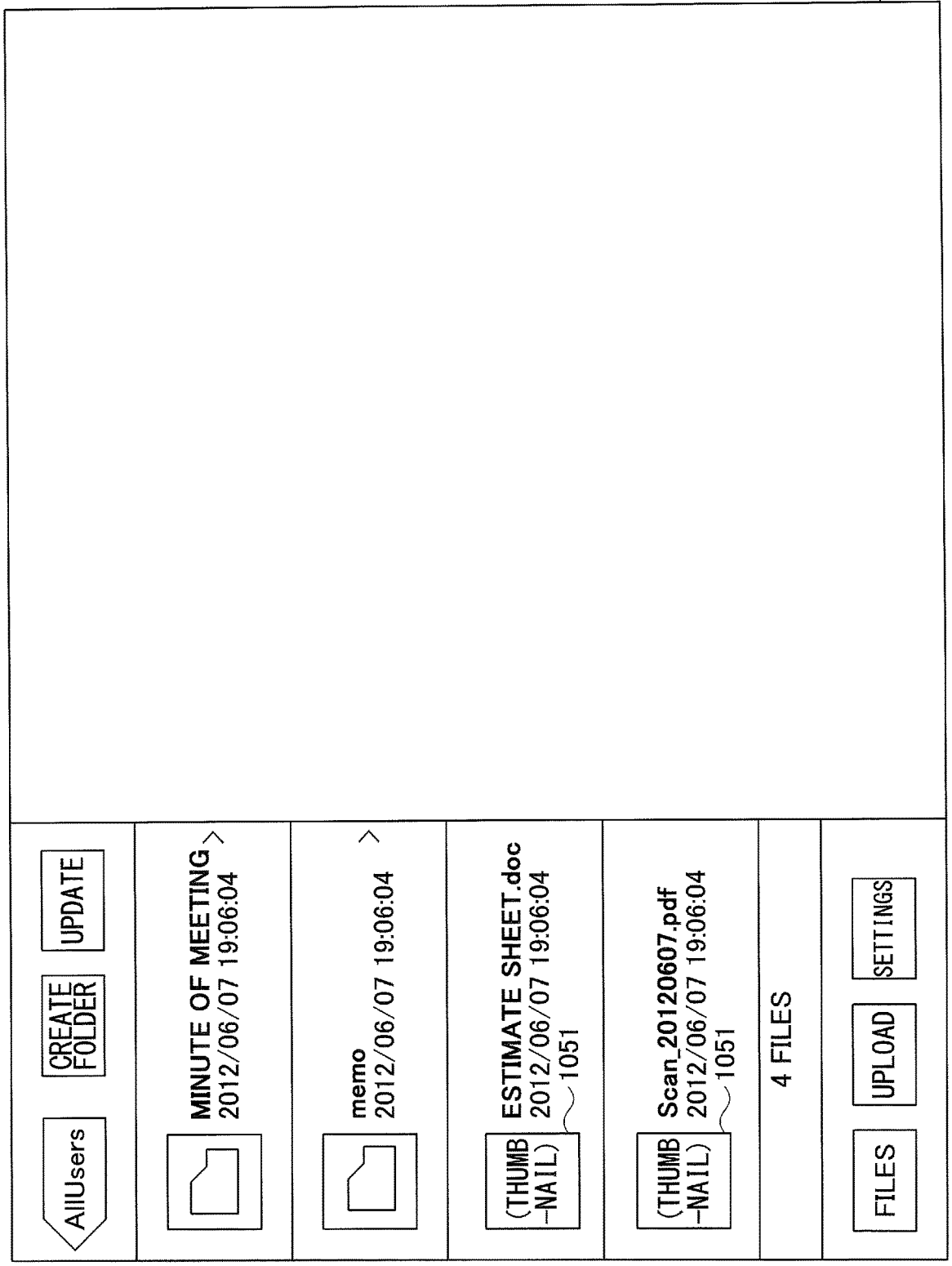
FIG. 9 is an image diagram of one example of a file list display screen page.

By repeating the processes of steps S1 to S4, the smartphone 11 displays screen pages such as those shown in FIGS. 7, 8 and 9. FIG. 7 is an image diagram of one example of an IT folder selection screen page. Via the IT folder selection screen page 1000 of FIG. 7, the user can select, as an IT folder, either "AllUsers" or "yamada".

FIG. 8 is an image diagram of one example of a folder display screen page. The folder display screen page 1010 of FIG. 8 is a screen page example displayed after the "AllUsers" IT folder has been selected from the IT folder selection screen page 1000 of FIG. 7. On the folder display screen page 1010 of FIG. 8, "category", "data" and "workflow" are displayed as folders.

FIG. 9 is an image diagram of one example of a file list display screen page. The file list display screen page 1050 of FIG. 9 is a screen page example displayed after the "data" folder has been selected from the folder display selection screen page 1010 of FIG. 8. On the file list display screen page 1050 of FIG. 9, "Estimate Sheet.doc" and "Scan_20120607.pdf" are displayed as files. Further, on the file list display screen page 1050 of FIG. 9, "Minutes of Meeting" and "memo" are displayed as folders.

On the file list display screen page of FIG. 9, the thumbnail images 1051 are displayed for "Estimate Sheet.doc" and "Scan_20120607.pdf" that are the files, and thus, the user can easily determine visually what these files are.

Further, it is possible that the file list display screen page 1050 of FIG. 9 displays only files that can be printed by the MFP 13, by displaying only files that are designated such file formats (for example, "rpcs") that the MFP 13 can print for the item "File format(s) to which file can be converted" included in the response shown in FIG. 6. Further, the file list display screen page 1050 of FIG. 9 can display whether it is necessary to convert the file format(s), by marking a file(s) that is(are) designated such a file format that the MFP 13 can print for the item "File format to which file has been converted" included in the response shown in FIG. 6.

In step S5, the user operates the smartphone 11 and selects a file to be printed by the MFP 13 from the file list display screen page 1050 of FIG. 9. Here, description will be made assuming that the user has selected the "Estimate Sheet.doc" file from the file list display screen page 1050.

When the "Estimate Sheet.doc" file, for example, has been thus selected from the file list display screen page 1050, the smartphone 11 sends a pdf file obtaining request via a HTTP request (GET) shown in FIG. 5, for example. It is noted that "pdf file" is merely one example, and any other file format can be designated instead as long as the smartphone 11 can display an image of the "Estimate Sheet.doc" file of the file format.

In step S7, the WebApi 26 of the information storage apparatus 10 receives the pdf file obtaining request, and sends a pdf file obtaining request to the Web control part 29. The Web control part 29 responds to the pdf file obtaining request and sends a pdf file obtaining request to the document management part 28.

The document management part 28 obtains the "Estimate Sheet.doc" file from the shared folder 27, and generates a pdf file therefrom. In a case where a pdf file of the "Estimate Sheet.doc" file has been already generated and is placed in the shared folder 27, it is possible to omit the process of generating a pdf file by the document management part 28. The Web control part 29 returns the pdf file generated by the document management part 28 to the WebApi 26. The WebApi 26 provides the pdf file to the smartphone 11 via a HTTP response.

Figure 10:
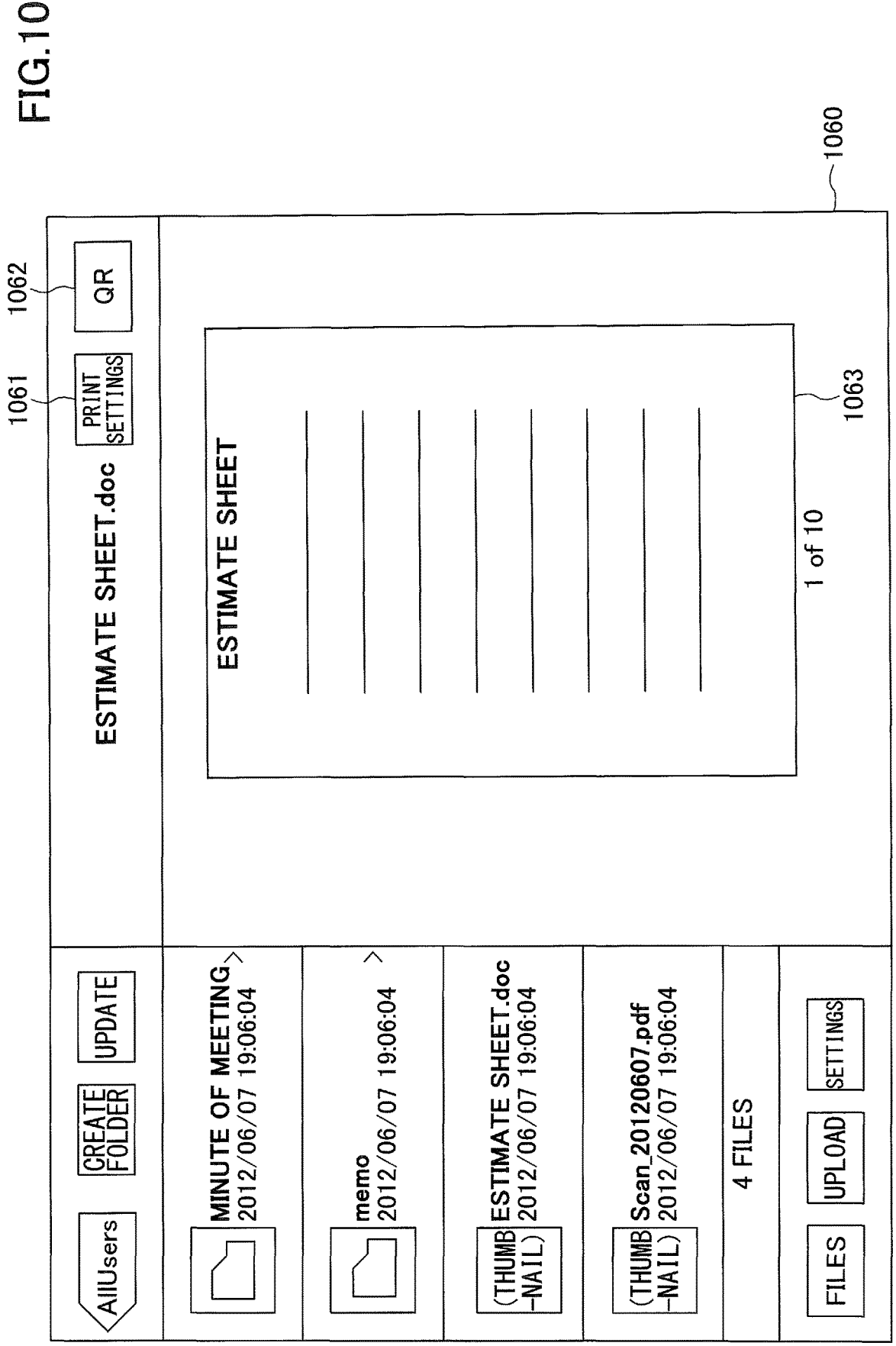
FIG. 10 is an image diagram of one example of a file detail display screen page.

The application installed in the smartphone 11 displays a file detail display screen page 1060 such as that shown in FIG. 10 based on the response to the pdf file obtaining request. FIG. 10 is an image diagram of one example of a file detail display screen page. The file detail display screen page 1060 of FIG. 10 is a screen page example displayed after the "Estimate Sheet.doc" file has been selected from the file list display screen page 1050 of FIG. 9.

On the file detail display screen page 1060 of FIG. 10, an image (detailed image) 1063 of the "Estimate Sheet.doc" selected from the file list display screen page 1050 of FIG. 9 is displayed.

The application of the smartphone 11 can display the image 1063 as a result of obtaining the pdf file. The user then confirms whether the image 1063 displayed on the file detail display screen page 1060 surely corresponds to the file to be printed.

After that, the user carries out print settings if necessary. Timing of print settings is not limited to the timing shown in FIG. 4. When a "print settings" button 1061 has been pressed on the file detail display screen page 1060 of FIG. 10, the smartphone 11 displays a print setting screen page 1070 shown in FIG. 11 in step S8. FIG. 11 is an image diagram of one example of a print setting screen page 1070. The user then operates the smartphone 11 and carries out settings for print to be carried out by the MFP 13 via the displayed print setting screen page 1070 of FIG. 11.

Figure 12:
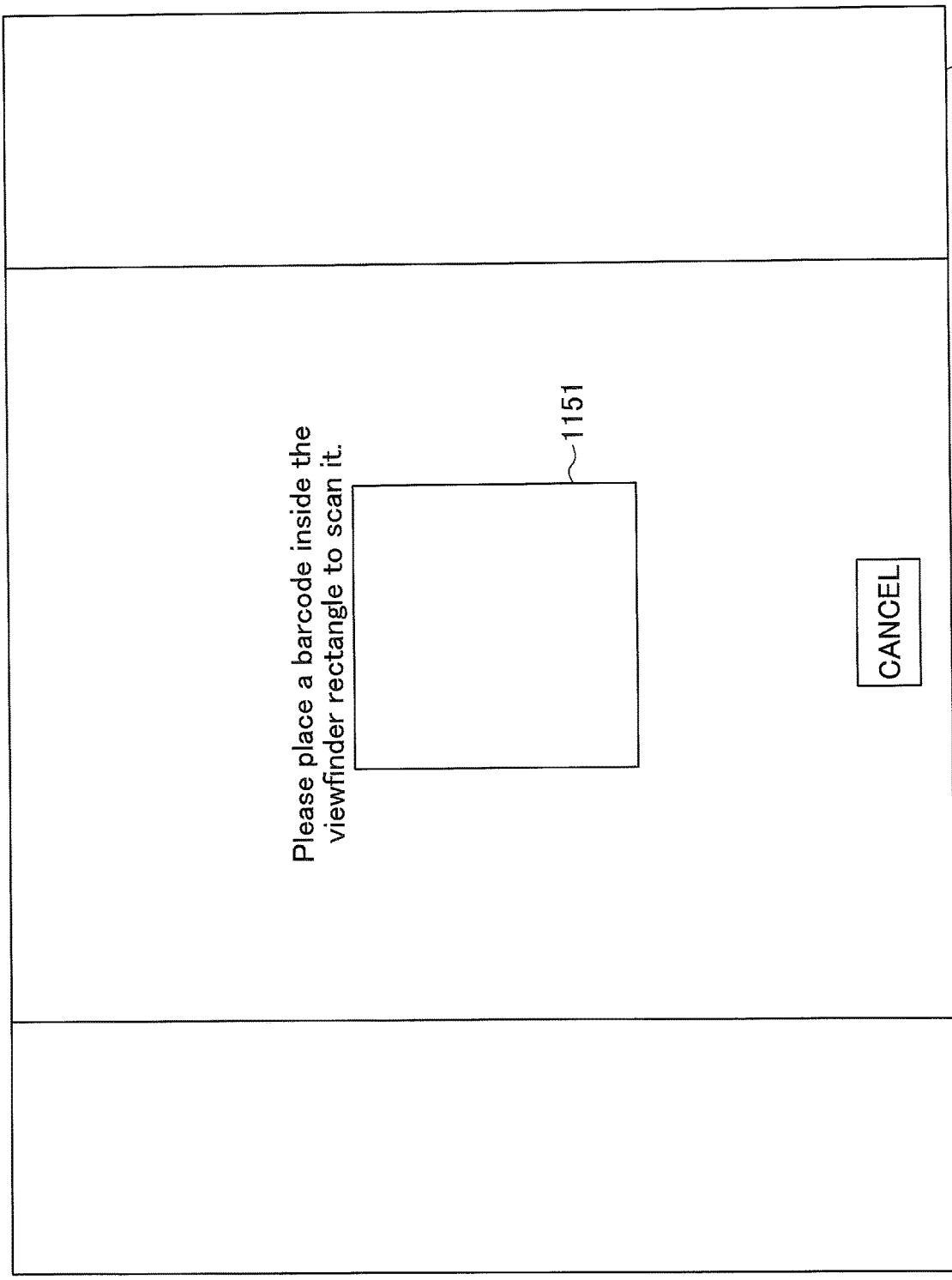
FIG. 12 is an image diagram of one example of a QR code reading screen page.

Further, by pressing a "QR" button 1062 on the file detail display screen page 1060 of FIG. 10, the user can cause a QR code reading screen page 1150, shown in FIG. 12, for example, to be displayed on the smartphone 11. FIG. 12 is an image diagram of one example of a QR code reading screen page 1150 displayed on the smartphone 11. The QR code reading screen page 1150 includes a QR code display area 1151. The QR code display area 1151 is an area in which an image taken by the camera function of the smartphone 11 will be displayed.

In steps S9 and S10 of FIG. 4, the user operates the smartphone 11, and adjusts a positional relationship between the QR code displayed on the MFP 13 (step S0) and the smartphone 11 so that the QR code an image of which is thus taken by the camera function of the smartphone 11 will be displayed in the QR code display area 1151 of the QR code reading screen page 1150 displayed on the smartphone 11.

The application of the smartphone 11 reads, from the QR code an image of which has been taken by the camera function, the IP address of the MFP 13 and the function information indicating the scan function and print function that the MFP 13 provides, as shown in FIG. 13. FIG. 13 is a configuration diagram of one example of the information that the application of the smartphone 11 reads from the QR code displayed in step S0 of FIG. 4.

It is noted that, a specific method of obtaining the IP address and function information of the MFP 13 or the like is not limited to the above-mentioned method of obtaining information from a QR code by photographing it. It is also possible to obtain the IP address and function information of the MFP 13 or the like using a communication way for sending and receiving information between the smartphone 11 and the MFP 13 or the like. For example, infrared communication, Bluetooth, NFC or the like can be used for this purpose. Thus, various methods can be used even without using a QR code.

Figure 14:
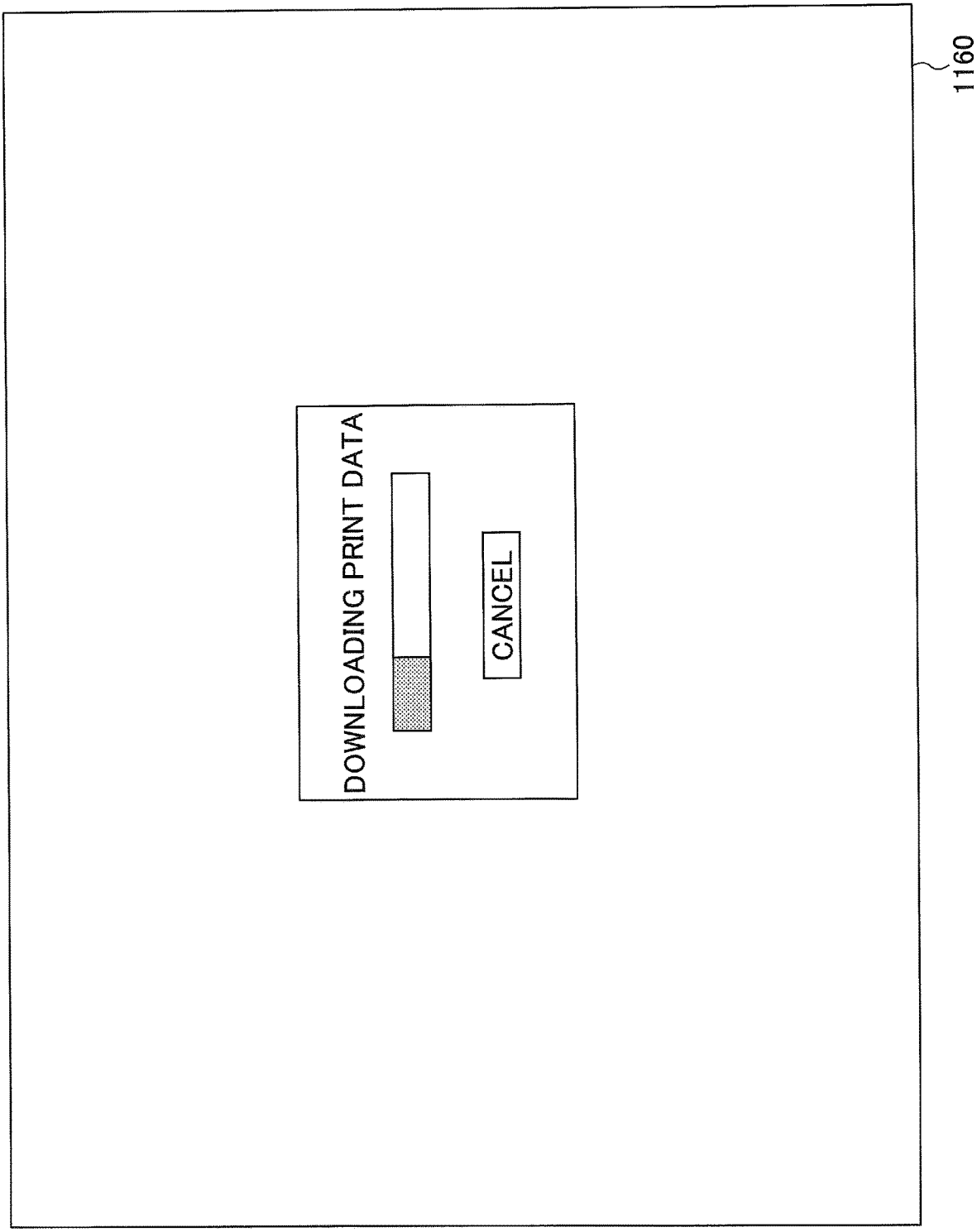
FIG. 14 is an image diagram of one example of a screen page indicating that downloading is being carried out.

After thus reading the IP address and the function information indicating the scan function and the print function of the MFP 13 from the QR code taken by the camera function, the application of the smartphone 11 displays to the user a screen page 1160 indicating that downloading is being carried out, as shown in FIG. 14. FIG. 14 is an image diagram of one example of the screen page 1160 indicating that downloading of a print file is being carried out. The screen page 1160 of FIG. 14 may be continuously displayed by the smartphone 11 until step S11 described later is completed.

It is noted that, timing of displaying the QR code on the MFP 13, timing of providing the file list from the information storage apparatus 10 to the smartphone 11 and timing of reading information from the QR code displayed on the MFP 13 by the smartphone 11 are not limited to the order shown in the sequence diagram of FIG. 4.

In step S11, the application of the smartphone 11 determines a file format as described later depending on the function information that the application of the smartphone 11 has read from the QR code. For example, the application of the smartphone 11 determines a file format (for example, "rpcs"), which can' be printed by the MFP 13, depending on the function information read from the QR code.

In step S12, the application of the smartphone 11 sends a "rpcs" file obtaining request to the information storage apparatus 10 via a HTTP request (GET) such as that shown in FIG. 5. The rpcs file obtaining request includes information of the file selection and information of the file format determined in step S11.

In Step S13, the WebApi 26 of the information storage apparatus 10 receives the rpcs file obtaining request and sends a corresponding rpcs file obtaining request to the Web control part 29. The Web control part 29 responds to the rpcs file obtaining request from the WebApi 26 and sends a corresponding rpcs file obtaining request to the document management part 28. The document management part 28 obtains the corresponding file from the shared folder 27 based on the "information of the file selection" included in the rpcs file obtaining request.

Further, the document management part 28 determines, based on the "information of the file format" included in the rpcs file obtaining request, whether it is necessary to convert the file format of the file thus obtained from the shared folder 27. For example, when the file format of the file obtained from the shared folder 27 is an rpcs format, it is the same as the file format indicated by the "information of the file format", and thus, the document management part 28 determines that conversion of the file format of the file obtained from the shared folder 27 is not necessary.

On the other hand, when the file format of the file obtained from the shared folder 27 and the file format indicated by the "information of the file format" are different from one another, the document management part 28 determines that conversion of the file format of the file obtained from the shared folder 27 is necessary. When having determined that it is necessary to convert the file format, the document management part 28 converts the file format into a rpcs format accordingly. Below, a case where the document management part 28 has determined that it is necessary to convert the file format will be described. The Web control part 29 then returns the converted file obtained from the document management part 28, the file format of which has been thus converted, to the WebApi 26.

In step S14, the WebApi 26 provides the converted file to the smartphone 11 via a HTTP response. In step S15, the application of the smartphone 11 transmits the converted file to the MFP 13 as a print file.

A specific method of thus transmitting a print file to the MFP 13 is, for example, a method of transmitting using a socket communication to the port of the number 9100 ("port 9100") of the MFP 13, as shown in FIG. 15. FIG. 15 illustrates one example of a method of transmitting a print file to the MFP 13. When having received the print file, the MFP 13 carries out print (output) based on the print file, in step S16.

FIG. 16 is a configuration diagram of one example of print commands included in a print file. The print commands of FIG. 16 include the contents of print settings that have been carried out via the print setting screen page 1070 of FIG. 11 (#2 in FIG. 16) and a file name of a file to be printed (#1 in FIG. 16).

Figure 17:
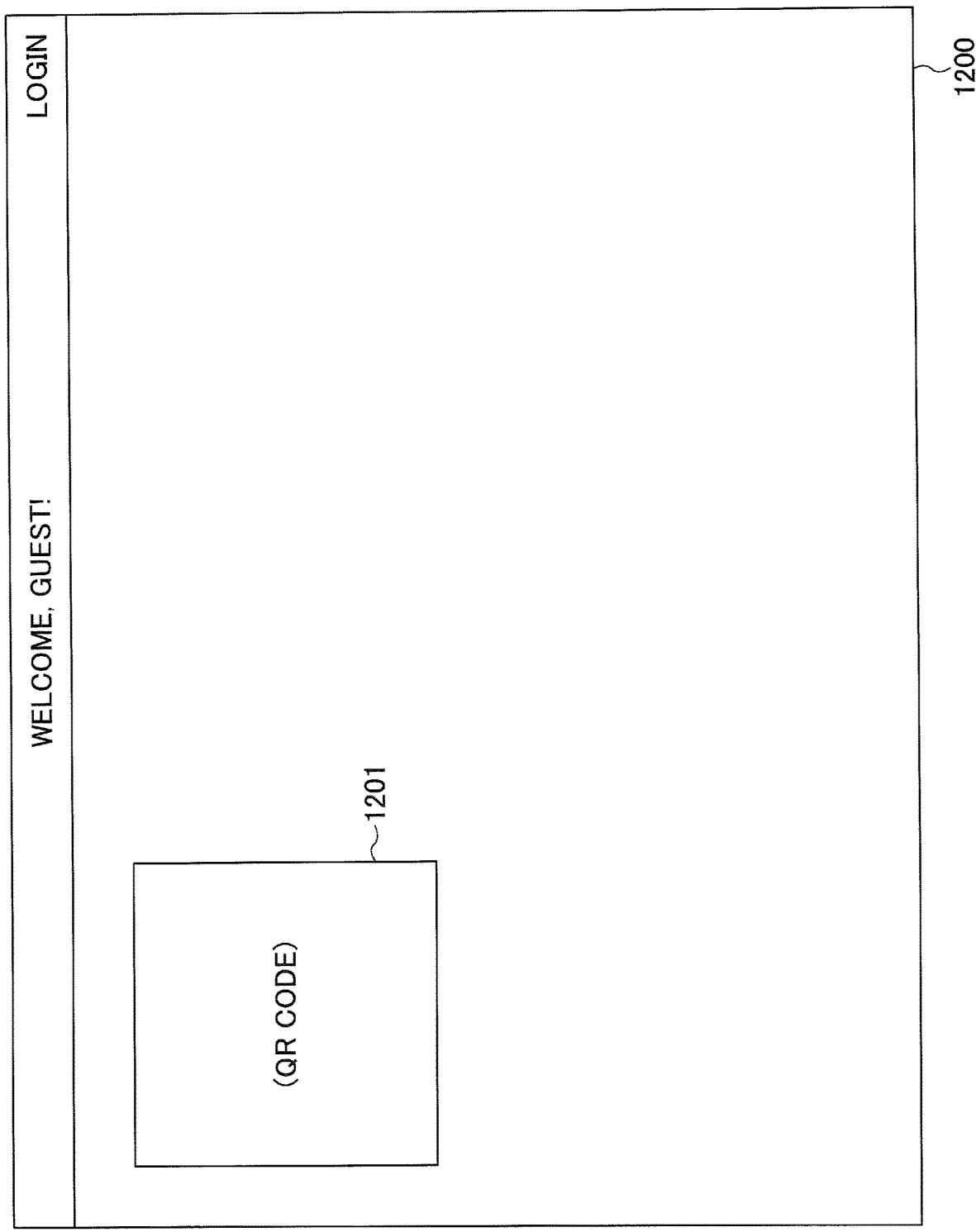
FIG. 17 is an image diagram of one example of the QR code displayed on the MFP.

Further, the MFP 13 can display (in step S0), via a Web browser (not shown), a screen page 1200 including a QR code 1201 as shown in FIG. 17 on an operation panel or the like of the MFP 13 as a result of displaying the QR code display Web UI 25 of the information storage apparatus 10.

Figure 18:
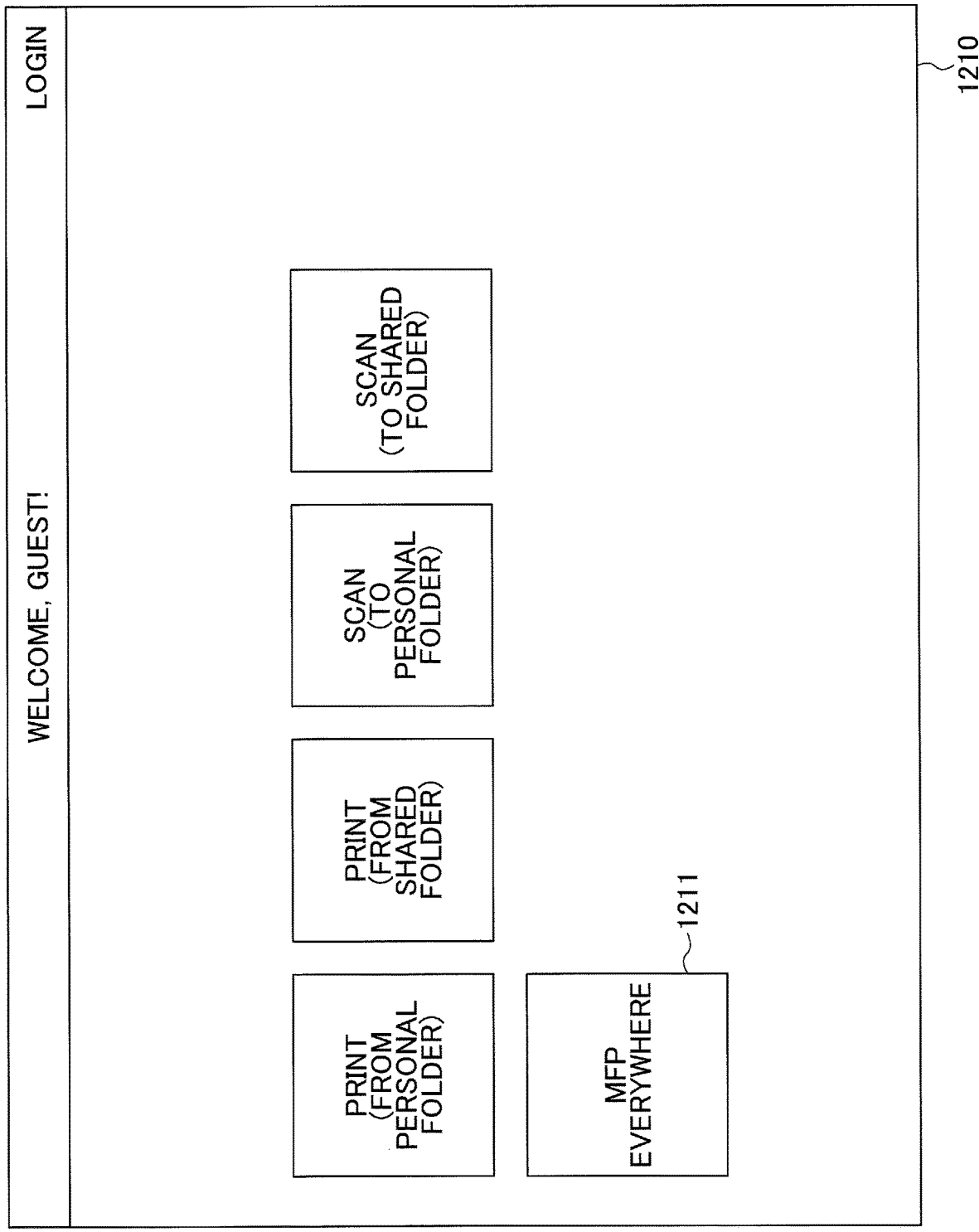
FIG. 18 is an image diagram of one example of a top screen page displayed on the MFP.

FIG. 17 is an image diagram of one example of a QR code displayed on the MFP 13. It is noted that the screen page 1200 of FIG. 17 is displayed as a result of a "MFP Everywhere" button 1211 on the top screen page 1210 of the Web browser (not shown) of the MFP 13 shown in FIG. 18 being pressed, for example. FIG. 18 is an image diagram of one example of the top screen page displayed on the MFP 13.

It is noted that, although the example of displaying the QR code 1201 on the screen page 1200 in FIG. 17 has been described, it is also possible to affix a seal of the QR code 1201 onto the housing of the MFP 13, as another example. Further, it is possible that the MFP 13 stores image data of the QR code 1201 in the MFP 13 itself. Other than affixing a seal of the QR code 1201 on the housing of the MFP 13, it is also possible to affix a seal of the QR code 1201 on, for example, a wall of a room in which the MFP 13 is installed. In other words, a specific position to affix a seal of the QR code 1201 is preferably a position such that a user can understand that the QR code 1201 is one that is associated with the MFP 13.

Figure 19:
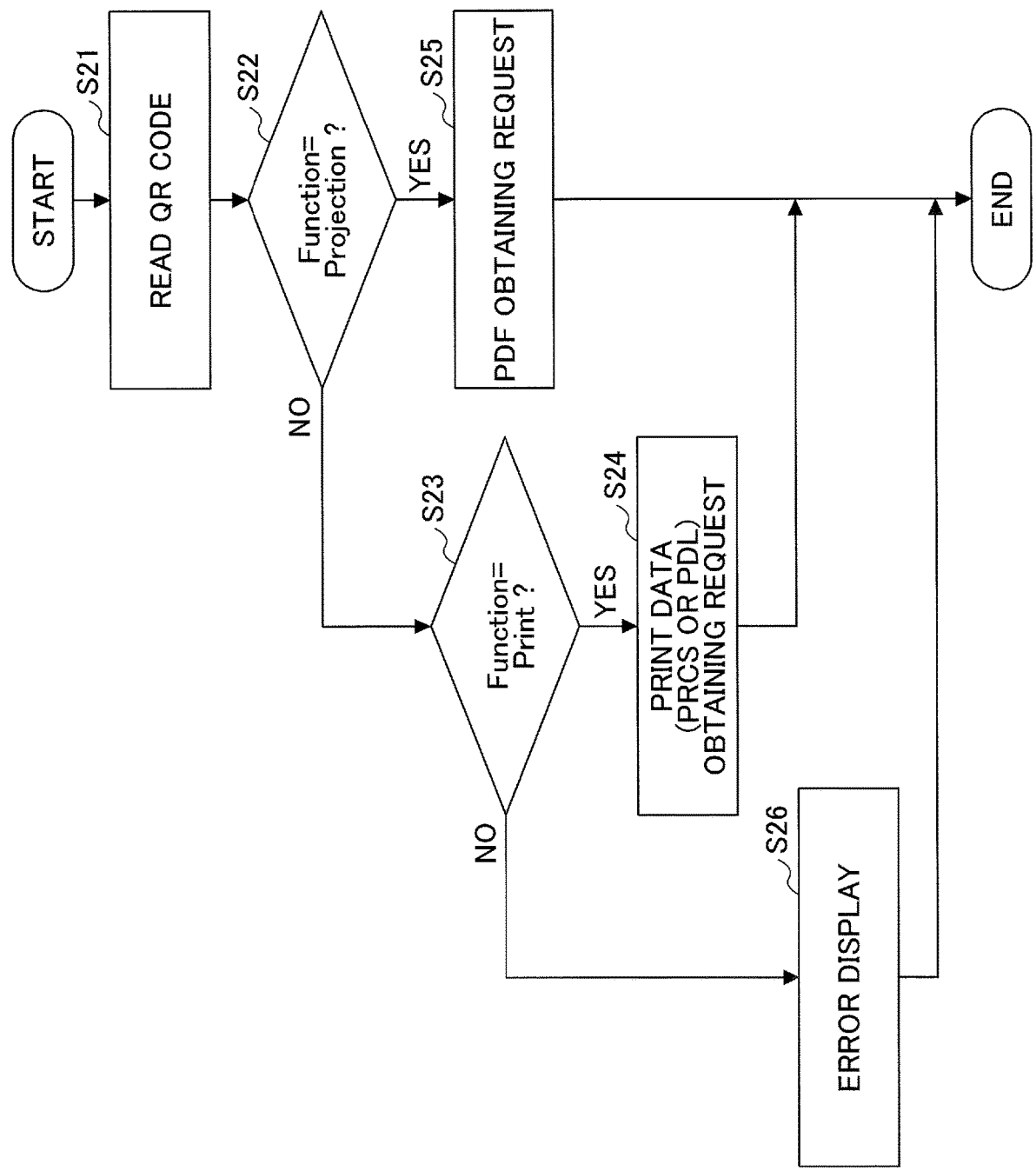
FIG. 19 is a flowchart of one example showing a procedure of a smartphone.

FIG. 19 is a flowchart of one example of a procedure of the smartphone 11. It is noted that the flowchart of FIG. 19 shows the procedure to be carried out after the QR code reading screen page 1150 shown in FIG. 12 has been displayed by the smartphone 11 as mentioned above.

In step S21 of FIG. 19, the application of the smartphone 11 reads the set value of item "Function" shown in FIG. 13 from the QR code that has been taken by the camera function of the smartphone 11.

In step S22, the application of the smartphone 11 determines whether the set value of item "Function" is "Projection" that indicates the projection function (projector 14). When the set value of item "Function" is "Projection" that indicates the projection function (projector 14), the application of the smartphone 11 proceeds to step S25, and sends a file obtaining request that designates PDF that can be projected by the projector 14 as a file format to the information storage apparatus 10.

When the set value of item "Function" is not "Projection" that indicates the projection function (projector 14), the application of the smartphone 11 proceeds to step S23, and determines whether the set value of item "Function" is "Print" that indicates the print function (MFP 13). When the set value of item "Function" is. "Print" that indicates the print function (MFP 13), the application of the smartphone 11 proceeds to step S24, and sends a file obtaining request that designates RPCS or PDL that can be printed by the MFP 13 as a file format to the information storage apparatus 10.

When the set value of item "Function" is not "Print" that indicates the print function (MFP 13) in step S23, the application of the smartphone 11 proceeds to step S26, and carries out an error display process since it is not possible to determine a file format to be designated in a file obtaining request.

According to the sequence diagram of FIG. 4, it is possible to display, on the smartphone 11, the files placed in the shared folder 27 of the information storage apparatus 10, by installing the WebApi 26 in the information storage apparatus 10. A user can obtain from the information storage apparatus 10 a converted file of a file format that can be printed by the MFP 13, by selecting the file via the smartphone 11 and reading via the smartphone 11 information from the QR code 1201 of the MFP 13 that the user wishes to use to print the file. The smartphone 11 can cause the MFP 13 to print the converted file thus obtained from the information storage apparatus 10 by transmitting the converted file to the MFP 13 as a print file. It is noted that also the smartphone 11 can store the converted file that has been obtained from the information storage apparatus 10.

Thus, a user can cause the information storage apparatus 10, the smartphone 11 and the MFP 13 to operate in cooperation with each other by holding the smartphone 11 against the MFP 13 at a time of starting print (to cause the smartphone 11 to read information from the QR code of the MFP 13), and thus, the user can easily print by the MFP 13 a file placed in the shared folder 27 of the information storage apparatus 10.

The sequence diagram of FIG. 4 shows the process of obtaining a file from the information storage apparatus 10 using the smartphone 11, and printing the file by the MFP 13. The service providing system 1 according to the first embodiment can also be used, as shown in FIG. 20, to obtain a file from the information storage apparatus 10 using the smartphone 11, and project the file by the projector 14.

Figure 20:
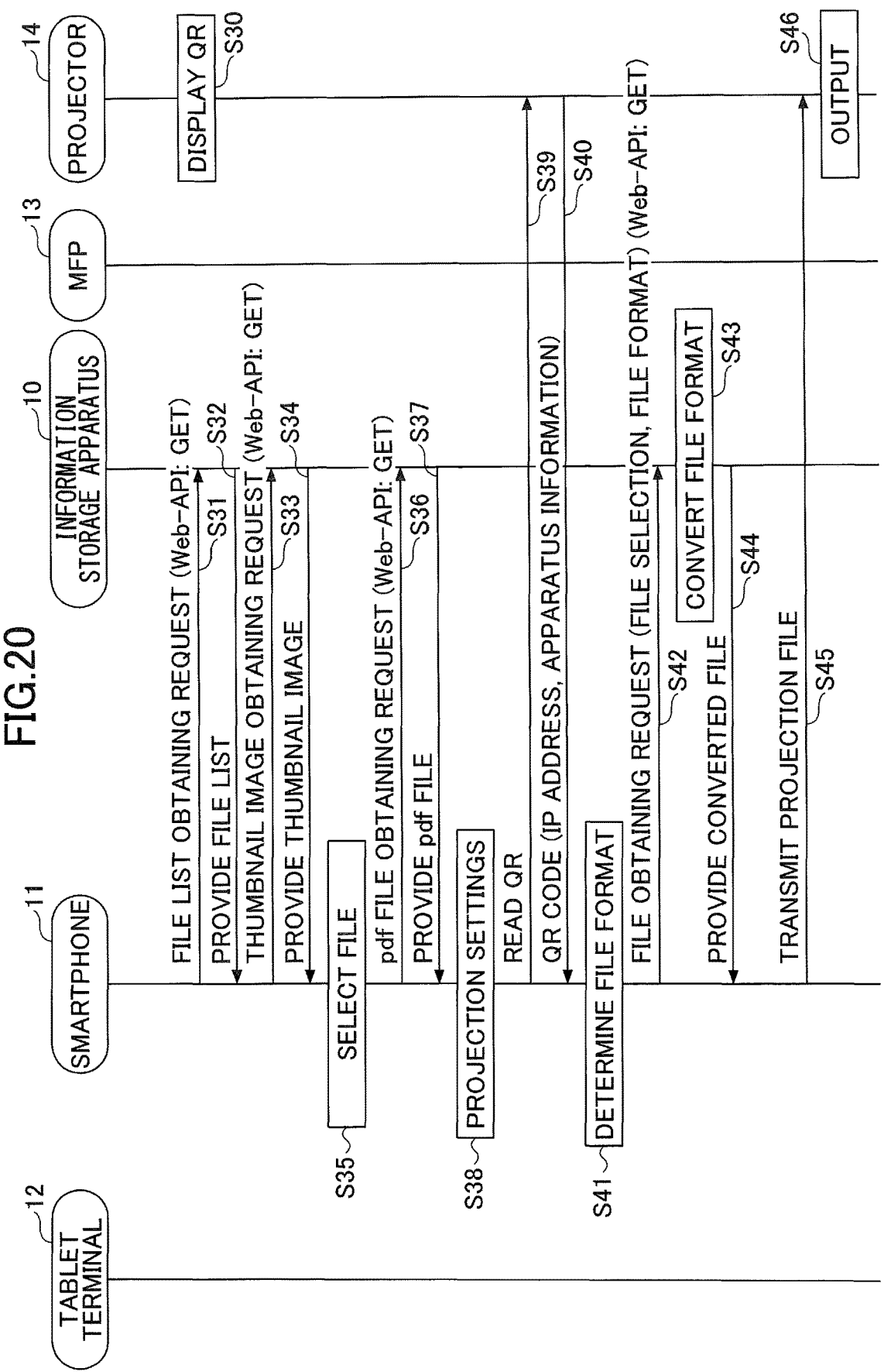
FIG. 20 is a sequence diagram of another example showing a procedure of the service providing system according to the first embodiment.

FIG. 20 is a sequence diagram of another example showing a procedure of the service providing system 1 according to the first embodiment. It is noted that the processes of step S30 and steps S31 to S37 of FIG. 20 are the same as those of step S0 and steps S1 to S7 of FIG. 4, and thus, duplicate description will be omitted.

When a "projection settings" button (not shown) has been pressed on the file detail display screen page 1060, the smartphone 11 displays a projection setting screen page in step S38. The user then operates the smartphone 11 and carries out settings for projection to be carried out by the projector 14 via the displayed projection setting screen page.

Further, by pressing the "QR" button 1062 on the file detail display screen page 1060, the user can cause the QR code reading screen page 1150, as shown in FIG. 12, for example, to be displayed on the smartphone 11.

Figure 23:
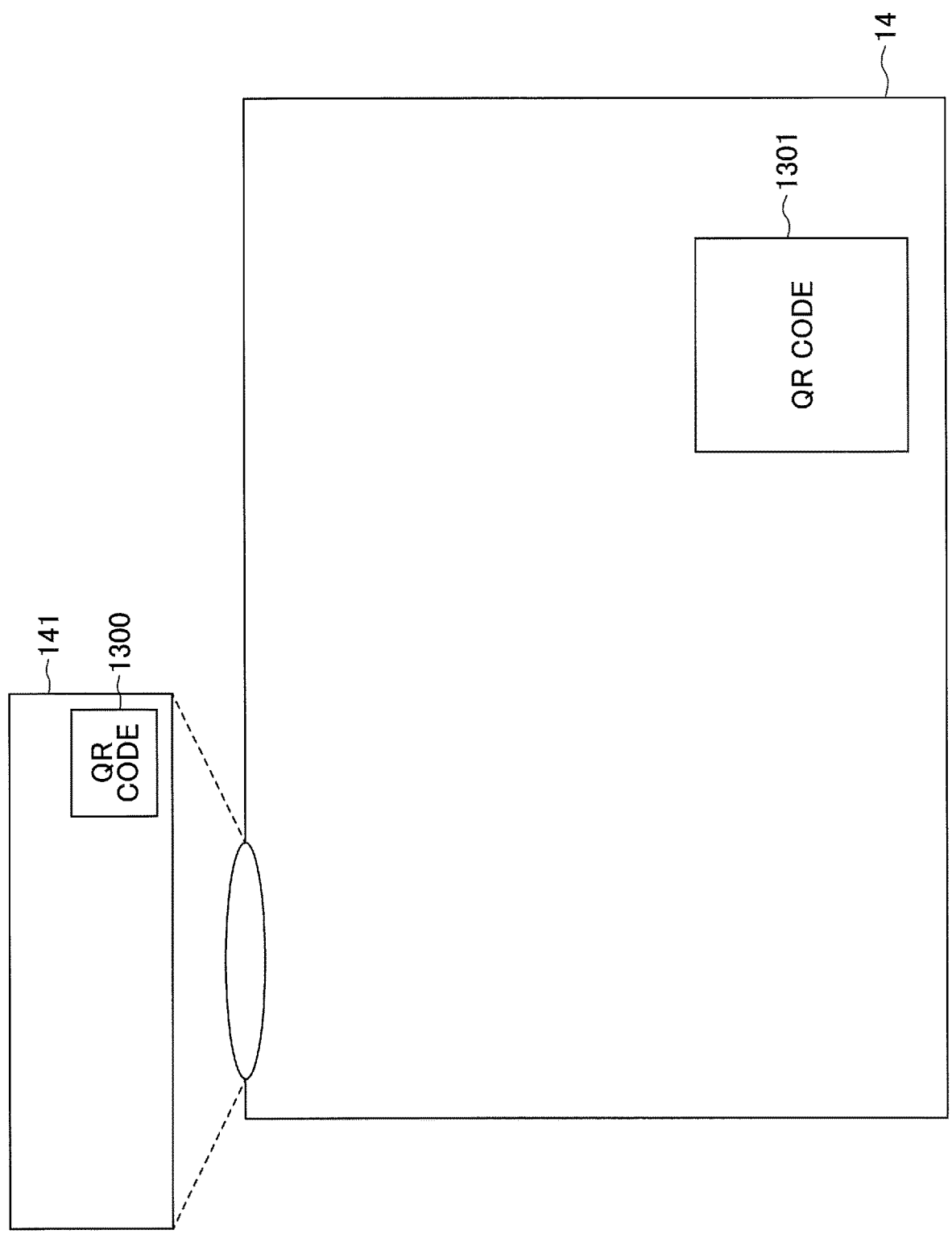
FIG. 23 is an image diagram of one example of the QR code displayed by the projector.

In steps S39 and S40, the user operates the smartphone 11, and adjusts a positional relationship between the QR code displayed by the projector 14 (step S30) (onto a projection screen 141 or the like as shown in FIG. 23 described later) and the smartphone 11 so that the QR code taken by the camera function of the smartphone 11 will be displayed in the QR code display area 1151 of the QR code reading screen page 1150 displayed on the smartphone 11.

The application of the smartphone 11 reads, from the QR code taken by the camera function of the smartphone 11, the IP address of the projector 14, a projector name, the function information indicating the projection function that the projector 14 provides, and a type of the projector 14 as shown in FIG. 21. FIG. 21 is a configuration diagram of one example of the information that the application of the smartphone 11 reads from the QR code.

After thus reading the IP address and the function information indicating the projection function of the projector 14 from the QR code, the application of the smartphone 11 displays the screen page indicating that downloading is being carried out to the user, as shown in FIG. 14.

It is noted that, timing of displaying the QR code by the projector 14, timing of providing the file list from the information storage apparatus 10 to the smartphone 11 and timing of reading information by the smartphone 11 from the QR code displayed by the projector 14 are not limited to the order shown in the sequence diagram of FIG. 20.

In step S41, the application of the smartphone 11 determines, as shown in FIG. 19, a file format depending on the function information that the application of the smartphone 11 has read from the QR code. For example, when the function information includes the projection function, the application of the smartphone 11 determines the file format (as PDF, for example) which can be projected by the projector 14.

In step S42, the application of the smartphone 11 sends an image file obtaining request to the information storage apparatus 10 via a HTTP request (GET) such as that shown in FIG. 5. The image file obtaining request includes information of the file selection and information of the file format determined in step S41.

In Step S43, the WebApi 26 of the information storage apparatus 10 receives the image file obtaining request and sends a corresponding image file obtaining request to the Web control part 29. The Web control part 29 responds to the image file obtaining request from the WebApi 26 and sends a corresponding image file obtaining request to the document management part 28. The document management part 28 obtains the corresponding image file from the shared folder 27 based on the "information of the file selection" included in the image file obtaining request.

The document management part 28 determines, based on the "information of the file format" included in the image file obtaining request, whether it is necessary to convert the file format of the file thus obtained from the shared folder 27. For example, when the file format of the file obtained from the shared folder 27 is a pdf format, the file format of the file obtained from the shared folder 27 and the file format indicated by the "information of the file format" are the same, and thus, the document management part 28 determines that conversion of the file format of the file obtained from the shared folder 27 is not necessary.

On the other hand, when the file format of the file obtained from the shared folder 27 and the file format indicated by the "information of the file format" are different from one another, the document management part 28 determines that conversion of the file format of the file obtained from the shared folder 27 is necessary. When having determined that it is necessary to convert the file format, the document management part 28 converts the file format of the file obtained from the shared folder 27 into a pdf format. Below, a case where the document management part 28 has determined that it is necessary to convert the file format will be described. The Web control part 29 then returns the converted file obtained from the document management part 28, the file format of which has been thus converted, to the WebApi 26.

In step S44, the WebApi 26 provides the converted file to the smartphone 11 via a HTTP response. In step S45, the application of the smartphone 11 transmits the converted file to the projector 14 as a projection file. It is noted that also the smartphone 11 can store the converted file that has been obtained from the information storage apparatus 10.

A specific method of transmitting a projection file to the projector 14 is, for example, a method of transmitting it using a WebApi that is published by the projector 14, as shown in FIG. 22. FIG. 22 illustrates one example of a method of transmitting a projection file to the projector 14.

When having received the projection file, the projector 14 carries out projection (output) based on the projection file, in step, S46.

Further, in order to display the QR code, the projector 14 can project a screen page including the QR code 1300 as shown in FIG. 23 on the projection screen 141 or the like, or it is also possible to affix a seal of the QR code 1301 onto the housing of the projector 14, for example. FIG. 23 is an image diagram of one example of a QR code to be displayed by or on the projector 14. For example, the projector 14 can thus project the QR code 1300 by displaying via a Web browser (not shown) the QR code display Web UI 25 of the information storage apparatus 10. Further, it is possible that the projector 14 stores image data of the QR code 1300 in the projector 14 itself, or obtains image data of the QR code 1300 from the outside.

Other than affixing a seal of the QR code 1301 on the housing of the projector 14, it is also possible to affix a seal of the QR code 1301 on, for example, a wall of a room in which the projector 14 is installed. In other words, a specific position to affix a seal of the QR code 1301 is preferably a position such that a user can understand that the QR code 1301 is one that is associated with the projector 14.

In the sequence diagram of FIG. 4, the processes have been shown for a case of obtaining a file from the information storage apparatus 10 using the smartphone 11 and printing the file by the MFP 13. However, the service providing system 1 according to the first embodiment can also be used for a case of, as shown in a sequence diagram of FIG. 24, using the tablet terminal 12 to obtain a file from the information storage apparatus 10 and print the file by the MFP 13.

FIG. 24 is a sequence diagram of yet another example of a procedure of the service providing system 1 according to the first embodiment. Since processes of step S50 and steps from S51 to S66 in the sequence diagram of FIG. 24 are the same as those of step S0 and steps from S1 to S16 of FIG. 4 except that the role of the smartphone 11 in the procedure of FIG. 4 is replaced by the tablet terminal 12 in the procedure of FIG. 24, description will be omitted.

Further, in the sequence diagram of FIG. 20, the processes have been shown for a case of obtaining a file from the information storage apparatus 10 using the smartphone 11 and projecting the file by the projector 14. However, the service providing system 1 according to the first embodiment can also be used for a case of, in the same manner as the case of FIG. 24, using the tablet terminal 12 to obtain a file from the information storage apparatus 10 and project the file by the projector 14 instead of printing the file by the MFP 13.

Thus, according to the service providing system of the first embodiment, it is possible to obtain, via an information processing apparatus such as the smartphone 11 or the tablet terminal 12, a file list and a file of a file format depending on the electronic apparatus that will output electronic data, as a result of installing the WebApi 26 in the information storage apparatus 10. Thus, it is possible to transmit the file of the file format depending on the electronic apparatus to the electronic apparatus from the information processing apparatus.

Second Embodiment

A service providing system 1 according to the second embodiment has the same system configuration, hardware configuration and software configuration as those of the service providing system 1 according to the first embodiment described above. Thus, the description of the system configuration, hardware configuration and software configuration will be omitted.

<Details of Processing>

Below, processing of the service providing system 1 according to the second embodiment will be described in detail.

Here, processes will now be described for a case of creating a folder and uploading files to the information storage apparatus 10 via the tablet terminal 12, and viewing the folder or files via the smartphone 11. FIG. 25 is a sequence diagram showing one example of a procedure of the service providing system 1 according to the second embodiment. FIG. 26 illustrates one example of a HTTP request that the information storage apparatus 10 receives.

That is, a user operates the tablet terminal 12, and selects a file list display process. When the file list display process has been thus selected by the user, the tablet terminal 12 sends a file list obtaining request to the information storage apparatus 10 by, for example, a HTTP request (GET) such as that shown in FIG. 5, in step S101.

Then, in step S102, the WebApi 26 of the information storage apparatus 10 receives the file list obtaining request, and sends a file list obtaining request to the Web control part 29. The Web control part 29 responds to the file list obtaining request sent by the WebApi 29, obtains a file list from the document management part 28 and returns the file list to the WebApi 26. The WebApi 26 provides the file list to the tablet terminal 12 via a HTTP response such as that shown in FIG. 6.

An application installed in the tablet terminal 12 displays a file list published by the information storage apparatus 10 based on the response to the file list obtaining request, on the folder display screen page 1010 of FIG. 8 described above, for example.

A user can request to create a folder by pressing a "Create Folder" button 1012 on the folder display screen page 1010 of FIG. 8. Here, a description will be now made assuming that the user has requested to create a "folder A". When creation of a "folder A" has been thus requested by the user, the tablet terminal 12 sends a folder creation request to the information storage apparatus 10 via, for example, a HTTP request (POST) shown in FIG. 26, in step S103.

In step S104, the WebApi 26 of the information storage apparatus 10 receives the folder creation request, and sends a folder creation request to the Web control part 29. The Web control part 29 responds to the folder creation request sent by the WebApi 29 and creates the "folder A" in the shared folder 27.

Figure 27:
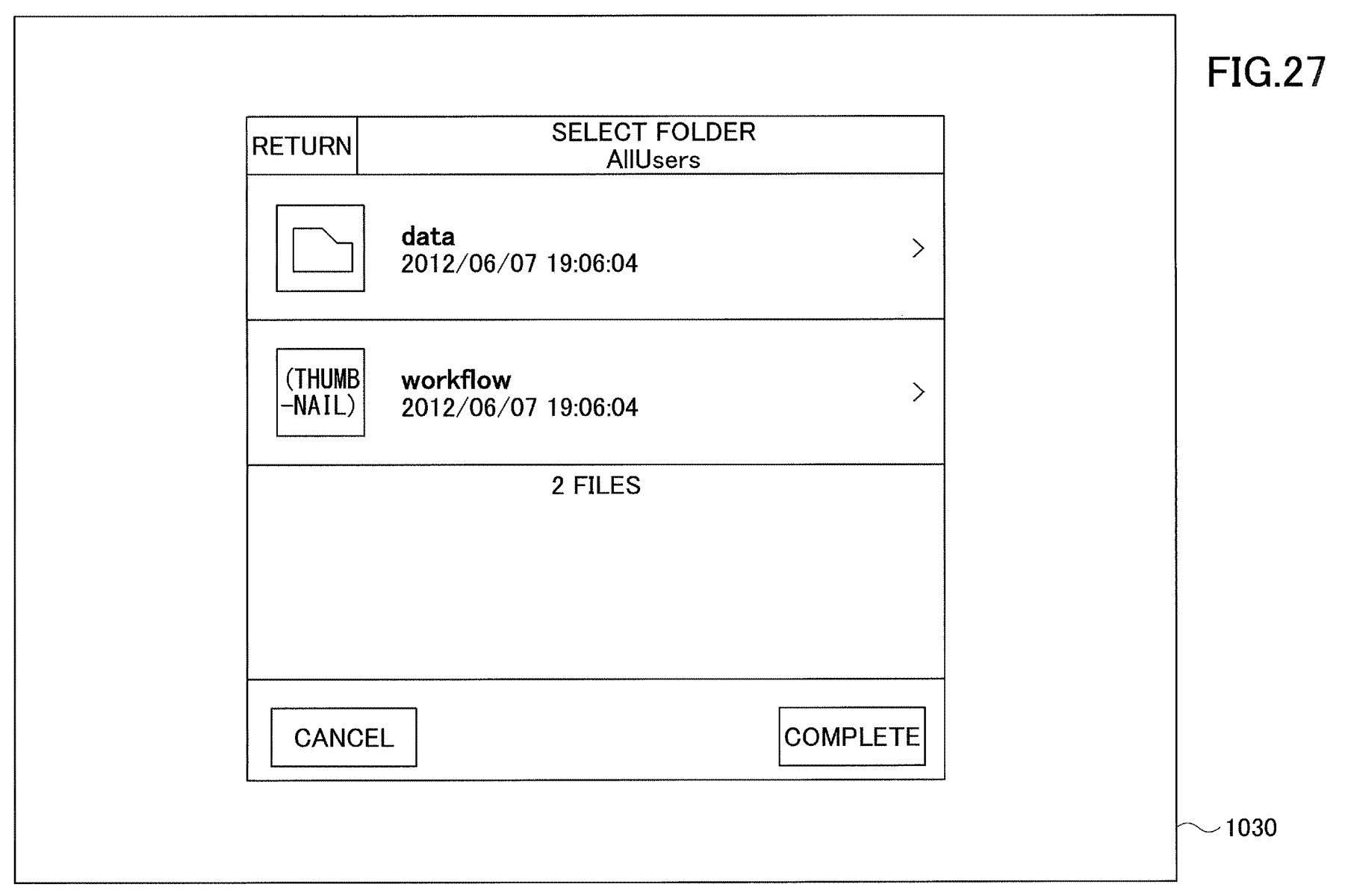

Further, when an "Upload" button 1011 has been pressed on the folder display screen page of FIG. 8, the tablet terminal 12 displays a folder selection screen page 1030 shown in FIG. 27. FIG. 27 is an image diagram of one example of a folder selection screen page 1030. The user can select a folder, to which uploading will be carried out, from the folder selection screen page 1030.

In step S105, the user operates the tablet terminal 12 and selects a folder, to which a file (i.e., a file obtained from photographing by a built-in camera, a file included in a memory card or the like) included in the tablet terminal 12 is to be stored, from among folders displayed on the folder selection screen page 1030 of FIG. 27. A description will now be made assuming that the "folder A" has been selected from the folder selection screen page 1030, to which a "file a" is to be stored.

When the user has requested to upload the "file a" to the "folder A", the tablet terminal 12 proceeds to step S106, and sends a file upload request to the information storage apparatus 10 via, for example, a HTTP request (POST) shown in FIG. 26. In step S107, the WebApi 26 of the information storage apparatus 10 receives the file upload request, and sends a file upload request to the Web control part 29. The Web control part 29 responds to the file upload request sent by the WebApi 29 and stores the "file a" in the "folder A".

Next, the user operates the smartphone 11, and selects a file list display process. When the file list display process has been thus selected by the user, the smartphone 11 sends a file list obtaining request to the information storage apparatus 10 by, for example, a HTTP request (GET) such as that shown in FIG. 5, in step S108.

In step S109, the information storage apparatus 10 provides a file list to the smartphone 11, in the same manner as step S102. In the file list thus provided at this time, the "folder A" created via the tablet terminal 12 in step S104 is included. The user therefore can check, via the smartphone 11, the "file a" that has been uploaded to the "folder A".

In step S110, the user operates the smartphone 11 and selects the "folder A" from among the folders displayed on the folder selection screen page 1030 of FIG. 27. Thus, the smartphone 11 can select the "folder A" that has been created via the tablet terminal 12.

Then, when the smartphone 11 has been requested by the user to upload a "file b" to the selected "folder A", the smartphone 11 proceeds to step S111, and sends a file upload request to the information storage apparatus 10 via, for example, a HTTP request (POST) shown in FIG. 26. In step S112, the WebApi 26 of the information storage apparatus 10 receives the file upload request, and sends a file upload request to the Web control part 29. The Web control part 29 responds to the file upload request sent by the WebApi 29, and stores the "file b" in the "folder A".

Next, the user operates the smartphone 11, and selects a file list display process. When the file list display process has been thus selected by the user, the smartphone 11 sends a file list obtaining request to the information storage apparatus 10 by, for example, a HTTP request (GET) such as that shown in FIG. 5, in step. S113.

In step S114, the information storage apparatus 10 provides a file list to the smartphone 11, in the same manner as step S102.

When creation of a "folder B" has been thus requested by the user, the smartphone 11 sends a folder creation request to the information storage apparatus 10 via, for example, a HTTP request (POST) shown in FIG. 26, in step S115.

In step S116, the WebApi 26 of the information storage apparatus 10 receives the folder creation request, and sends a folder creation request to the Web control part 29. The Web control part 29 responds to the folder creation request sent by the WebApi 29 and creates the "folder B" in the shared folder 27.

Next, the user operates the tablet terminal 12 different from the smartphone 11, and selects a file list display process. When the file list display process has been thus selected by the user, the tablet terminal 12 sends a file list obtaining request to the information storage apparatus 10 by, for example, a HTTP request (GET) such as that shown in FIG. 5, in step S117.

In step S118, the information storage apparatus 10 provides a file list to the tablet terminal 12, in the same manner as step S102. In step S119, the user operates the tablet terminal 12 and selects the "folder B" from the folder selection screen page 1030. Thus, also the tablet terminal 12 can select the "folder B" that has been created via the smartphone 11.

Then, when the tablet terminal 12 has been requested by the user to upload a "file c" to the "folder B", the tablet terminal 12 proceeds to step S120, and sends a file upload request to the information storage apparatus 10 via, for example, a HTTP request (POST) shown in FIG. 26. In step S121, the WebApi 26 of the information storage apparatus 10 receives the file upload request, and sends a file upload request to the Web control part 29. The Web control part 29 responds to the file upload request sent by the WebApi 29 and stores the "file c" in the "folder B".

According to the sequence diagram of FIG. 25, by installing the WebApi 26 that is compatible with POST of a HTTP request in the information storage apparatus 10, a user can create a folder using an information processing apparatus (the tablet terminal 12), and then, the user can use another information processing apparatus (the smartphone 11) to view the same folder and upload a file to the folder.

Also, according to the sequence diagram of FIG. 25, a user can use an information processing apparatus to view a file which the user has uploaded to a folder using another information processing apparatus. It is noted that, although creating a folder and uploading a file have been described as examples using the sequence diagram of FIG. 25, it is also possible to delete or copy a folder or a file via a HTTP request (POST) such as that shown in FIG. 26 in the same way.

Processes have been described using the sequence diagram of FIG. 25 for a case of creating a folder or uploading a file using an information processing apparatus (tablet terminal 12), and then, viewing the thus created folder or the thus uploaded file using another information processing apparatus (smartphone 11).

The service providing system 1 according to the second embodiment can also be used to, as shown in FIG. 28, cause a folder that has been created or a file that has been uploaded using an information processing apparatus (tablet terminal 12) to be printed by the MFP 12 using another information processing apparatus (smartphone 11).

FIG. 28 is a sequence diagram of anther example of a procedure of the service providing system according to the second embodiment. It is noted that processes of steps S131 to S151 of FIG. 28 are the same as those of steps S101 to S121, and thus, duplicate description will be omitted.

The user operates the smartphone 11, and selects a file list display process. When the file list display process has been thus selected by the user, the smartphone 11 sends a file list obtaining request to the information storage apparatus 10 by, for example, a HTTP request (GET) such as that shown in FIG. 5, in step S152. Then, in step S153, the WebApi 26 of the information storage apparatus 10 provides a list of files to the smartphone 11, in the same manner as step S2 of FIG. 4.

Further, in step S154, the smartphone 11 sends a thumbnail image obtaining request via, for example, a HTTP request (GET) such as that shown in FIG. 5, to the information storage apparatus 10. Then, in step S155, the WebApi 26 of the information storage apparatus 10 provides thumbnail images to the smartphone 11 in the same way as step S4 of FIG. 4.

The application installed in the smartphone 11 displays a file list published by the information storage apparatus 10 based on the response to the thumbnail image obtaining request shown in FIG. 6. In the file list thus displayed by the smartphone 11, folders that have been created and files that have been uploaded via the tablet terminal 12 are included.

Further, in step S156, also, the user can view, using the smartphone 11, the folders that have been created and the files that have been uploaded using the tablet terminal 12, and the user can select, using the smartphone 11, a file to be printed by the MFP 13 from among the files that have been uploaded using the tablet terminal 12. It is noted that the processes of step S130 and steps starting from step S157 are the same as those of step S0 and steps starting from step S6 of FIG. 4, and thus, the duplicate description will be omitted.

Further, by replacing the processes starting from step S152 of FIG. 28 by the processes starting from step S31 of FIG. 20, the user can cause, using another information processing apparatus (smartphone 11), the projector 14 to project a folder that the user has created or a file that the user has uploaded using an information processing apparatus (tablet terminal 12).

According to the service providing system 1 of the second embodiment, a user can create a folder using an information processing apparatus, then select the folder and upload a file to the selected folder using another information processing apparatus, by installing the WebApi 26 in the information storage apparatus 10. Also, a user can view, using another information processing apparatus, a file that the user has uploaded to a folder using an information processing apparatus.

It is noted that, although creating a folder and uploading a file have been described as examples using the service providing system 1 according to the second embodiment, it is also possible to use the service providing system 1 according to the second embodiment to delete or copy a folder or a file using a HTTP request (POST) such as that shown in FIG. 26.

Further, also it is naturally possible to use a facsimile function that the MFP 13 has, and transmit data stored in the information storage apparatus 10 by fax. In this case, in step S159 of FIG. 28, facsimile transmission conditions are set instead of setting print conditions (print settings).

The facsimile transmission conditions include, for example, whether to attach a letter of transmittal, a transmission result notification destination, whether to print date and time, transmission source information, transmission destination information and/or the like. Further, it is also possible to use, for the facsimile transmission conditions, information of another application that is installed and operates in the smartphone. For example, it is possible for a user to select a transmission destination telephone number from among data that is managed by the other application installed for managing addresses.

The information storage apparatus 10 generates facsimile transmission image data according to the received facsimile transmission conditions (facsimile transmission settings). It is noted that the information storage apparatus 10 can use the facsimile transmission image data that is previously generated, or can generate the facsimile transmission image data after receiving a facsimile transmission instruction from the smartphone 11.

The thus generated facsimile transmission image data is then transmitted to the MFP 13 through the information storage apparatus 10. The MFP 13 transmits the received facsimile transmission image data to the transmission destination.

Further, in addition to displaying data stored in the information storage apparatus 10 on the smartphone 11, it is also possible that data stored in the information storage apparatus 10 is also stored in the smartphone 11.

Summary of Embodiments

Thus, according to the service providing systems 1 according to the embodiments, a user can obtain advantageous effects as follows. That is, by holding an information processing apparatus (operation terminal) such as the smartphone 11 or the tablet terminal 12 against an electronic apparatus such as the MFP 13 or the projector 14 to obtain information for identifying the electronic apparatus such as a QR code, the user can cause a cooperative processing apparatus such as the information storage apparatus 10, the information processing apparatus and the electronic apparatus to operate in cooperation with each other, and receive various services that are realized by using the electronic apparatus.

Further, the service providing systems 1 according to the embodiments can provide various services, as a result of an electronic apparatus such as the MFP 13 or the projector 14, an information processing apparatus (operation terminal) such as the smartphone 11 or the tablet terminal 12 and a cooperative processing apparatus such as the information storage apparatus 10 operating in cooperation with each other by a cooperation method that is depending on the respective services such as print, projection and scan to be provided.

Further, a cooperation method concerning a new service to be provided by an electronic apparatus such as the MFP 13, the projector 14 or another new electronic apparatus can be previously defined in the service providing systems according to the embodiments. Thereby, it is possible to cause an electronic apparatus such as the MFP 13, the projector 14 or another new apparatus, an information processing apparatus (operation terminal) such as the smartphone 11 or the tablet terminal 12 and a cooperative processing apparatus such as the information storage apparatus 10 to operate in cooperation with each other by the cooperation method that is depending on the new service. Thus, it is possible to obtain the new service in addition to existing services using the service providing systems.

For example, in the service providing systems according to the embodiments, it is possible to previously define such that the process shown in the sequence diagram of FIG. 4 is to be carried out, in a case where the MFP 13 has a function of directly communicating with the smartphone 11. Further, in the service providing systems according to the embodiments, it is possible to previously define such that the information storage apparatus 10 is caused to carry out communication with the MFP 13, in a case where the MFP 13 does not have a function of directly communicating with the smartphone 11. Thus, in the service providing systems according to the embodiments, it is possible to change a process(es) depending on whether the MFP 13 has a function of directly communicating with the smartphone 11. Thus, it is possible to provide a service(s) depending on various MFPs 13.

Thus, according to the non-transitory computer readable information recording media, the operation terminals and the output systems of the embodiments, apparatuses included in the system operate in cooperation with each other to provide a service(s).

Although the non-transitory computer readable information recording media, the operation terminals and the output systems have been described by the embodiments, the present invention is not limited to the specifically disclosed embodiments, and variations and modifications may be made without departing from the scope of the present invention.

It is noted that the embodiments described above include the following features:

Feature 1:

An information storage apparatus that has an electronic data storage part storing electronic data, receives, via previously defined interfaces, requests from a plurality of information processing apparatuses connected to the information storage apparatus, and carries out processes of creating storage places in or deleting storage places from the electronic data storage part based on the received requests so as to make it possible that the plurality of the information processing apparatuses share the electronic data storage part, the information storage apparatus including:

a storage place creation part that receives, via the previously defined interfaces, requests for creating the storage places to store electronic data in the electronic data storage part, from the respective information processing apparatuses, the requests being generated by the respective information processing apparatuses to include predetermined conditions, and carries out processes of creating the storage places to store electronic data in the electronic data storage part based on the received requests and the predetermined conditions included in the received requests; and a storage place deletion part that receives, via the previously defined interfaces, requests for deleting the storage places from the electronic data storage part from the respective ones of the information processing apparatuses who have sent the requests for creating the storage places received by the storage place creation part and the information processing apparatus other than those who have sent the requests, the requests being generated by the respective information processing apparatuses to include predetermined conditions, and carries out processes of deleting the storage places from the electronic data storage part based on the received requests and the predetermined conditions included in the received requests.

Feature 2:

The information storage apparatus as described in Feature 1, further including a copying part that receives requests for copying the storage places to store electronic data in the electronic data storage part or requests for copying electronic data stored in the storage places, via the previously defined interfaces, from the respective ones of the information processing apparatuses who have sent the requests for creating the storage places received by the storage place creation part and the information processing apparatuses other than those who have sent the requests, the requests being generated by the respective information processing apparatuses to include predetermined conditions, and carries out processes of copying of the storage places of the electronic data storage part or the electronic data based on the received requests and the predetermined conditions included in the received requests.

Feature 3:

The information storage apparatus as described in Feature 1 or 2, further including an electronic data storage processing part that receives requests for storing electronic data in the storage places to store electronic data in the electronic data storage part, via the previously defined interfaces, from the respective ones of the information processing apparatuses who have sent the requests for creating the storage places received by the storage place creation part and the information processing apparatuses other than those who have sent the requests, the requests being generated by the respective information processing apparatuses to include predetermined conditions, and carries out processes of storing the electronic data in the storage places based on the received requests and the predetermined conditions included in the received requests.

Feature 4:

An information storage apparatus that has an electronic data storage part storing electronic data, receives, via previously defined interfaces, requests from a plurality of information processing apparatuses connected to the information storage apparatus, and carries out, based on the received requests, processes of storing electronic data in the electronic data storage part or providing electronic data stored in the electronic data storage part to the information processing apparatuses who have sent the requests, so as to make it possible that the plurality of the information processing apparatuses share the electronic data storage part and electronic data stored in the electronic data storage part, the information storage apparatus including:

a storage control part that receives, via the previously defined interfaces, requests for storing electronic data in the electronic data storage part and the electronic data to be stored, from the respective ones of the plurality of information processing apparatuses, the requests being generated by the respective information processing apparatuses to include predetermined conditions, and carries out processes of storing the electronic data in the electronic data storage part, based on the received requests and the predetermined conditions included in the received requests; and an electronic data providing part that receives, via the previously defined interfaces, requests for obtaining electronic data stored in the electronic data storage part by the storage control part, from the respective ones of the information processing apparatuses who have sent the requests for storing electronic data received by the storage control part and the information processing apparatuses other than those who have sent the requests, the requests being generated by the respective information processing apparatuses to include predetermined conditions, and provides, to the information processing apparatuses who have sent the received requests, the electronic data that is in accordance with the received requests based on the predetermined conditions included in the received requests.

Feature 5:

The information storage apparatus as described in Feature 4, further including a stored data information providing part that receives requests for obtaining information concerning electronic data stored in the electronic data storage part, via the previously defined interfaces, from the respective information processing apparatuses, the requests being generated by the respective information processing apparatuses to include predetermined conditions, and generates stored data information concerning electronic data stored in the electronic data storage part based on the received requests and the predetermined conditions included in the received requests, and provides the generated stored data information to the information processing apparatuses who have sent the requests.

Feature 6:

The information storage apparatus as described in Feature 5, wherein the electronic data providing part receives, via the previously defined interfaces, requests for obtaining electronic data, from the respective information processing apparatuses, the requests being generated by the information processing apparatuses based on at least one set of information of a data format to be able to convert into included in the stored data information to include the information of the data format, and provides electronic data that is in accordance with the received requests to the information processing apparatuses who have sent the requests after converting the electronic data into the data format that is based on the information of the data format included in the requests.

Feature 7:

The information storage apparatus as described in Feature 4, further including a storage place creation part that receives, via the previously defined interfaces, requests for creating storage places to store electronic data in the electronic data storage part, from the respective information processing apparatuses, the requests being generated by the respective information processing apparatuses to include predetermined conditions, and carries out processes of creating the storage places to store electronic data in the electronic data storage part based on the received requests and the predetermined conditions included in the received requests Feature 8:

The information storage apparatus as described in Feature 7, wherein the storage control part receives requests for storing electronic data in the storage places and the electronic data to be stored via the previously defined interfaces from the respective ones of the information processing apparatuses who have sent the requests for creating the storage places received by the storage place creation part and the information processing apparatuses other than those who have sent the requests, the requests being generated by the respective information processing apparatuses to include predetermined conditions, and stores the electronic data in the storage places based on the received requests and the predetermined conditions included in the received requests.

Feature 9:

The information storage apparatus as described in Feature 8, wherein the electronic data providing part receives, via the previously defined interfaces, requests for obtaining electronic data stored in the storage places by the storage control part from the respective ones of the information processing apparatuses who have sent the requests for creating the storage places received by the storage place creation part and the information processing apparatuses other than those who have sent the requests, the requests being generated by the respective information processing apparatuses to include predetermined conditions, and provides the electronic data that is in accordance with the received requests to the information processing apparatuses who have sent the received requests based on the received requests and the predetermined conditions included in the received requests.

What is claimed is:

1. A method comprising:
   obtaining, by a first method, function information from a designated output device;
   the obtained function information indicating a first output function or a second output function;
   the second output function differing from the first output function;
   displaying, by the output device, a QR code including the function information and connection information, in a case in which the output device includes function information indicating the first output function;
   projecting, by the output device, a QR code including the function information and connection information, in a case in which the output device includes function information indicating the second output function differing from the first output function;
   determining whether an output function that the designated output device provides is the first output function or the second output function, based on the function information obtained by the first method; and
   sending, to the designated output device, output data corresponding to the determined output function by a second method different than the first method,
   wherein the first output function is printing, and the second output function is projection; and
   wherein when it is determined that the output function is projection, sending by a second method, to the output device, output data for projection using the connection information acquired from the projected QR code.

2. The method according to claim 1,
   wherein the method further comprises sending, based on the determining, a request to an information storage apparatus for the output data corresponding to the determined output function; and
   wherein the output data, sent by the second method different than the first method, is received in response to the request, and sent to the designated output device.

3. The method according to claim 1,
   wherein the method further comprises obtaining, by the first method, connection information for the second method; and
   wherein the output data, sent by the second method different than the first method, is sent to the designated output device using the obtained connection information.

4. The method according to claim 1, further comprising generating the output data in a file format corresponding to the determined output function.

5. The method according to claim 4, wherein the file format is at least one of a PDL or a PDF file format.

6. The method according to claim 1, wherein the first method incudes use of at least one of infrared communication, Bluetooth, NFC, or a QR code.

7. The method according to claim 1 wherein the second method is a socket communication method.

8. An operation terminal comprising:
   a memory; and
   a processor configured to:
   obtain, by a first method, function information and connection information from a designated output device;
   the obtained function information indicating a first output function or a second output function; the second output function differing from the first output function;
   determine whether an output function that the designated output device provides is the first output function or the second output function, based on the function information obtained by the first method; and
   send, to the designated output device, output data corresponding to the determined output function by a second method different than the first method based on the connection information;
   wherein the obtained function information is obtained from a QR code displayed by the designated output device, in a case in which the designated output device includes function information indicating the first output function; and
   wherein the obtained function information is obtained from a QR code projected by the designated output device, in a case in which the designated output device includes function information indicating the second output function differing from the first output function,
   wherein the first output function is printing, and the second output function is projection; and
   wherein when it is determined that the output function is projection, sending by a second method, to the output device, output data for projection using the connection information acquired from the QR code projected.

9. A system comprising:
an operation terminal; and
an output device;
wherein the operation terminal includes:
a memory; and
a processor configured to:
obtain, by a first method, function information and connection information from the output device; the obtained function information indicating a first output function or a second output function; the second output function differing from the first output function;
determine whether an output function that the output device provides is the first output function or the second output function, based on the function information obtained by the first method; and
send, to the output device, output data corresponding to the determined output function by a second method different than the first method based on the connection information; and
wherein the output device includes:
a second memory; and
a second processor configured to:
display a QR code including the function information and connection information, in a case in which the output device includes function information indicating the first output function;
project a QR code including the function information and connection information, in a case in which the output device includes function information indicating the second output function differing from the first output function;
receive the sent output data; and
output the sent output data;
wherein the first output function is printing, and the second output function is projection; and
wherein when it is determined that the output function is projection, sending by a second method, to the output device, output data for projection using the connection information acquired from the QR code projected.

10. The system according to claim 9,
wherein the first processor is further configured to send, based on the determining, a request to an information storage apparatus for the output data corresponding to the determined output function; and
wherein the output data, sent by the second method different than the first method, is received in response to the request, and sent to the designated output device.

11. The system according to claim 9,
wherein the first processor is further configured to obtain, by the first method, connection information for the second method; and
wherein the output data, sent by the second method different than the first method, is sent to the output device using the obtained connection information.

12. The system according to claim 9, wherein the second processor is further configured to cause the generation of the output data in a file format corresponding to the determined output function.

13. The system according to claim 12, wherein the file format is at least one of a PDL or a PDF file format.

14. The system according to claim 9, wherein the first method incudes use of at least one of infrared communication, Bluetooth, NFC, or a QR code.

15. The system according to claim 1, wherein the second method is a socket communication method.

16. The system according to claim 9,
wherein the determining includes determining whether the output function is printing; and
wherein the determining includes determining whether the output function is projection.

17. The method according to claim 1,
wherein the method further comprises determining a file format based on the determined output function;
sending a request to an information storage apparatus for the output data, which corresponds to the determined file format; and
wherein the output data, sent by the second method different than the first method, is received from the information storage apparatus in response to the request, and sent to the designated output device.

* * * * *